(12) United States Patent
Reeder et al.

(10) Patent No.: US 11,833,956 B2
(45) Date of Patent: Dec. 5, 2023

(54) COVER SYSTEM FOR OPEN-TOPPED CONTAINERS

(71) Applicant: Aero Industries, Inc., Indianapolis, IN (US)

(72) Inventors: Ryan A. Reeder, Carmel, IN (US); John Vogel, Naples, FL (US)

(73) Assignee: Aero Industries, Inc., Indianapolis, IN (US)

( * ) Notice: Subject to any disclaimer, the term of this patent is extended or adjusted under 35 U.S.C. 154(b) by 803 days.

(21) Appl. No.: 16/937,796

(22) Filed: Jul. 24, 2020

(65) Prior Publication Data

US 2022/0025700 A1    Jan. 27, 2022

(51) Int. Cl.
| | |
|---|---|
| *B60P 7/04* | (2006.01) |
| *B60J 11/02* | (2006.01) |
| *E06B 9/68* | (2006.01) |
| *B65D 90/66* | (2006.01) |
| *B60J 7/08* | (2006.01) |
| *B60J 7/06* | (2006.01) |

(52) U.S. Cl.
CPC ............... *B60P 7/04* (2013.01); *B65D 90/66* (2013.01); *E06B 9/68* (2013.01); *B60J 7/068* (2013.01); *B60J 7/085* (2013.01)

(58) Field of Classification Search
CPC .. B60J 7/085; B60J 7/068; B60J 11/02; B60P 7/02; B60P 7/04
USPC ................. 296/98, 100.14, 100.15
See application file for complete search history.

(56) References Cited

U.S. PATENT DOCUMENTS 9,908,391 B2 *   3/2018  Williamson ............. B60J 7/185

FOREIGN PATENT DOCUMENTS

| CA | 2996297 C | * | 1/2020 | .............. B60J 7/085 |
| CN | 103322088 B | * | 5/2015 | |

* cited by examiner

*Primary Examiner* — Dennis H Pedder
(74) *Attorney, Agent, or Firm* — Maginot, Moore & Beck LLP

(57) ABSTRACT

An arm assembly for a cover system includes a force mechanism associated within a hollow arm of the assembly that includes a resiliently compressible element, such as a compression spring or gas spring, connected to one end of a cable. The opposite end of the cable is fastened to a non-circular pulley mounted to the container body, so that the cable is wound around the pulley as the arm pivots relative to the container body. As the arm pivots in a stowed direction, energy is stored by the compressible element, and releasing the stored energy causes the arm to pivot toward an extended or deployed position.

26 Claims, 41 Drawing Sheets

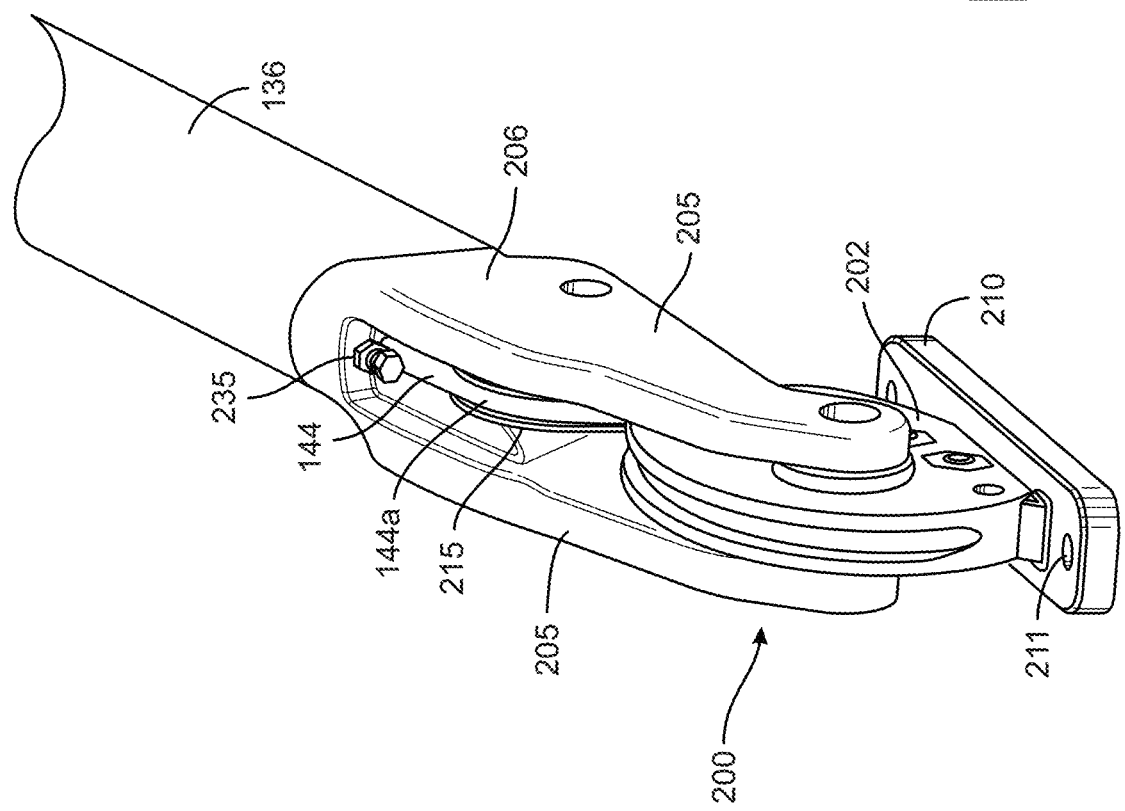

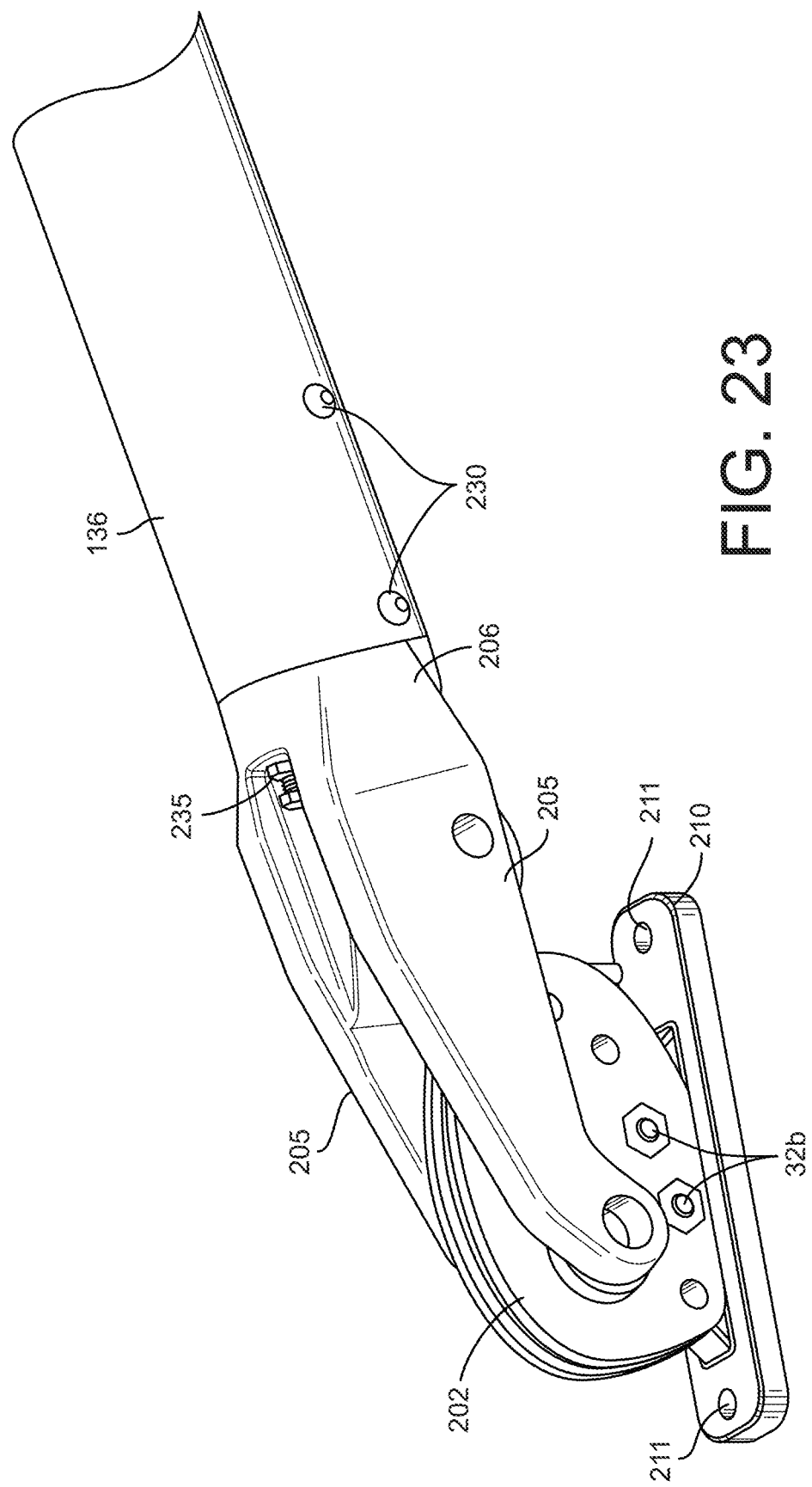

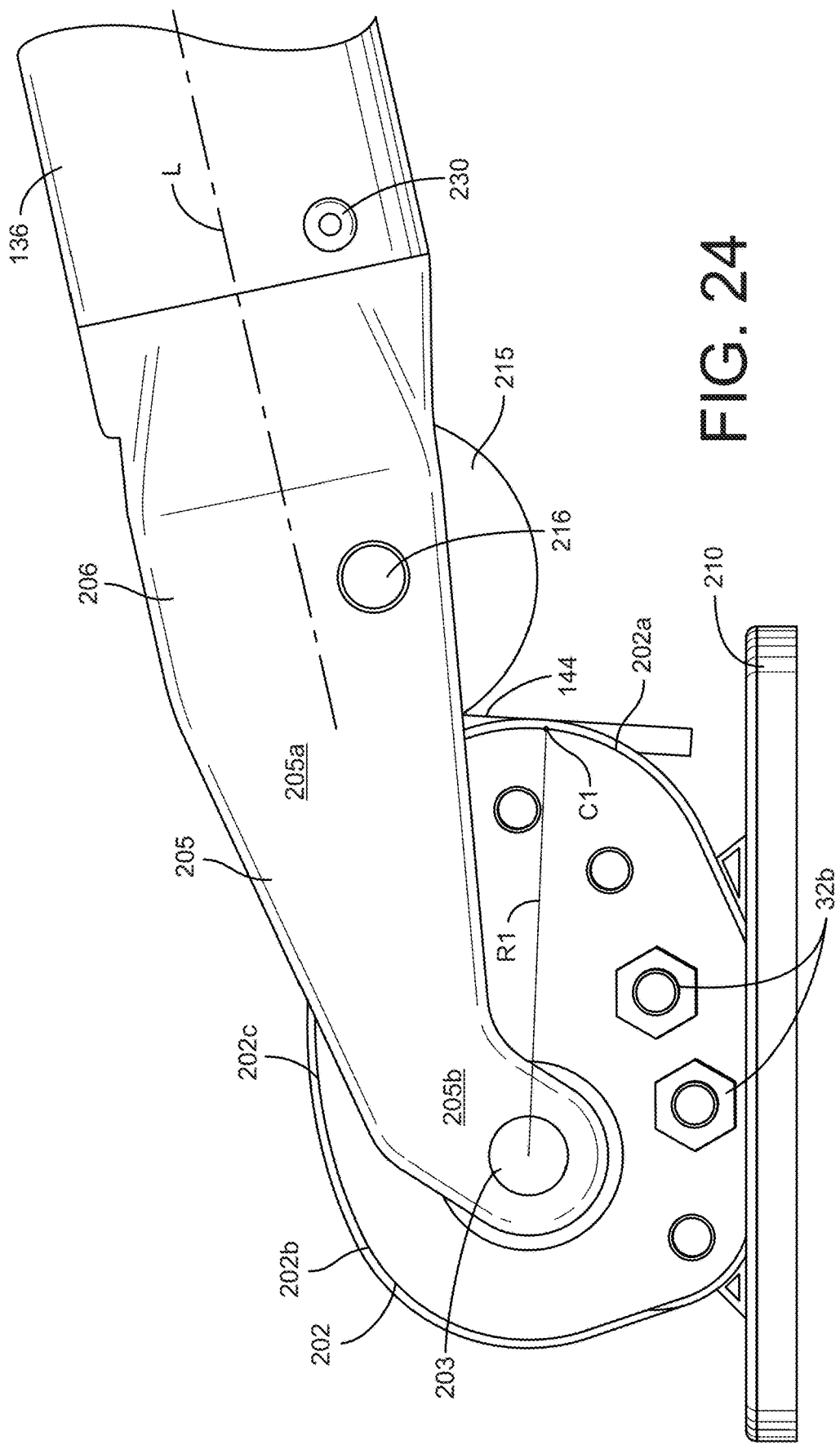

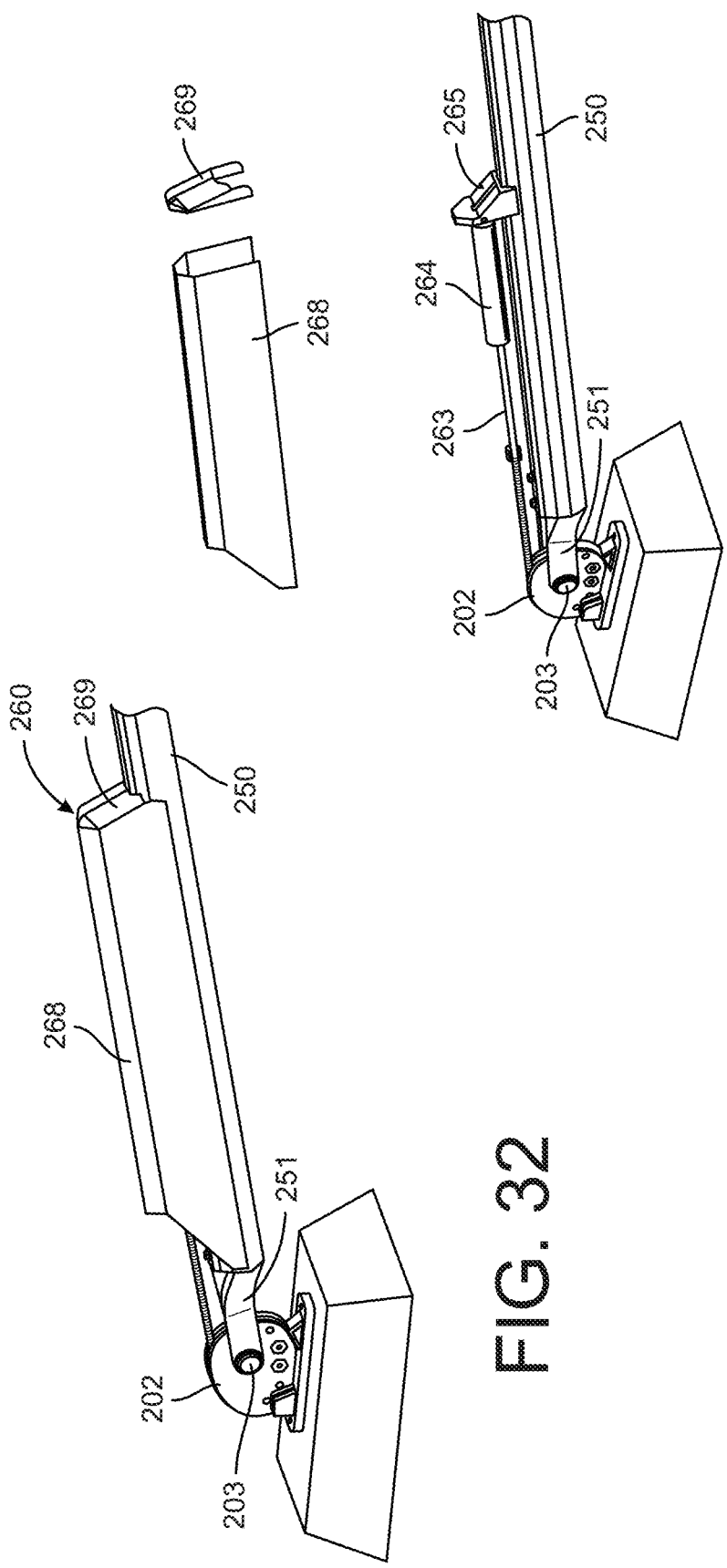

COVER SYSTEM FOR OPEN-TOPPED CONTAINERS

BACKGROUND

The present disclosure relates to cover systems for open-topped containers, such as dump bodies, refuse haulers, grain trailers and the like. These cover systems utilize flexible covers, such as tarpaulins, that are pulled across the open top of the container body. The flexible cover is wound onto a roller as the cover is moved to its open or stowed position and unwound from the roller as the cover is moved to a closed position covering the container body. An arm assembly supports the opposite ends of the flexible to control the movement of the cover to and from its end positions.

The conventional cover systems utilize torsion springs to propel the arms in one direction or another, typically from the open position to the closed, covering position. A motor winds the cover on the roller against the force of the torsion spring to pre-load the spring. When it is desired to deploy the cover, the motor is reversed and the torsion spring unwinds to gradually pull the cover to the covering position.

Torsion springs for cover systems can be underbody springs that are exposed to the harsh environment underneath a moving vehicle. Flat or spiral torsion springs are also used in cover systems, with the benefit of being contained within a housing at the side of the container body. However, each individual spiral spring does not provide enough torque to consistently move a typical cover system. Thus, multiple spiral springs are provided in a typical system, which increases the width of the spring pack and thus the width of the cover system. Various governmental regulations limit the width of a vehicle and thus the width that a cover system may extend beyond the sides of the vehicle. These width regulations limit the number of spiral springs that can be incorporated into a spring pack, and thus inherently limit the torque characteristics of the arm assembly.

Consequently, there is a need for a cover system that is capable of generating the torque profile needed to move a container cover system, while still maintaining a package dimension that meets all government width regulations.

SUMMARY

A cover system includes an arm assembly mounted between a container body and a flexible cover wound onto a roller. The arm assembly includes a force mechanism contained within a hollow arm of the assembly. The force mechanism is configured to store energy based on the movement of the hollow arm, and to release the stored energy to move the arm. In one embodiment, the force mechanism includes a resiliently compressible element, such as a compression spring or gas spring, connected to one end of a cable or wire. The opposite end of the cable is fastened to a non-circular pulley mounted to the container body. The non-circular pulley defining a pivot point and has a major dimension from the pivot point to the a first tangent point on the outer surface and a minor dimension from the pivot point to a second tangent point on the outer surface, the major dimension being greater than the minor dimension. The cable contacts the pulley at the first tangent point when the arm is in a first position and is wrapped on the pulley to contact the second tangent point when the arm is in a second position. The force mechanism is configured to store energy when the arm moves from the first position to the second position and to release energy to move the arm from the second position to the first position.

The cover system can include a motor mounted to the free end of the arm assembly and engaged to a roller carrying the flexible cover. The motor is operable to wind the cover around the roller to move the cover to its open position uncovering the open top of the container. The force mechanism is configured to unwind the cover from the roller to move the cover from its open/stowed position to its closed/extended position covering the open top of the container.

DESCRIPTION OF THE FIGURES

FIG. 22 is an end perspective view of a force transmission mechanism according to a further embodiment of the disclosure.

FIG. 23 is a side perspective view of the force transmission mechanism shown in FIG. 22.

FIG. 24 is an enlarged side view of the force transmission mechanism shown in FIG. 22, depicted with the bail arm in its extended position.

FIG. 32 is a side perspective view of a torque mechanism according to a further embodiment of the disclosure.

FIG. 33 is an exploded view of the torque mechanism shown in FIG. 32.

DETAILED DESCRIPTION

Figure 1:
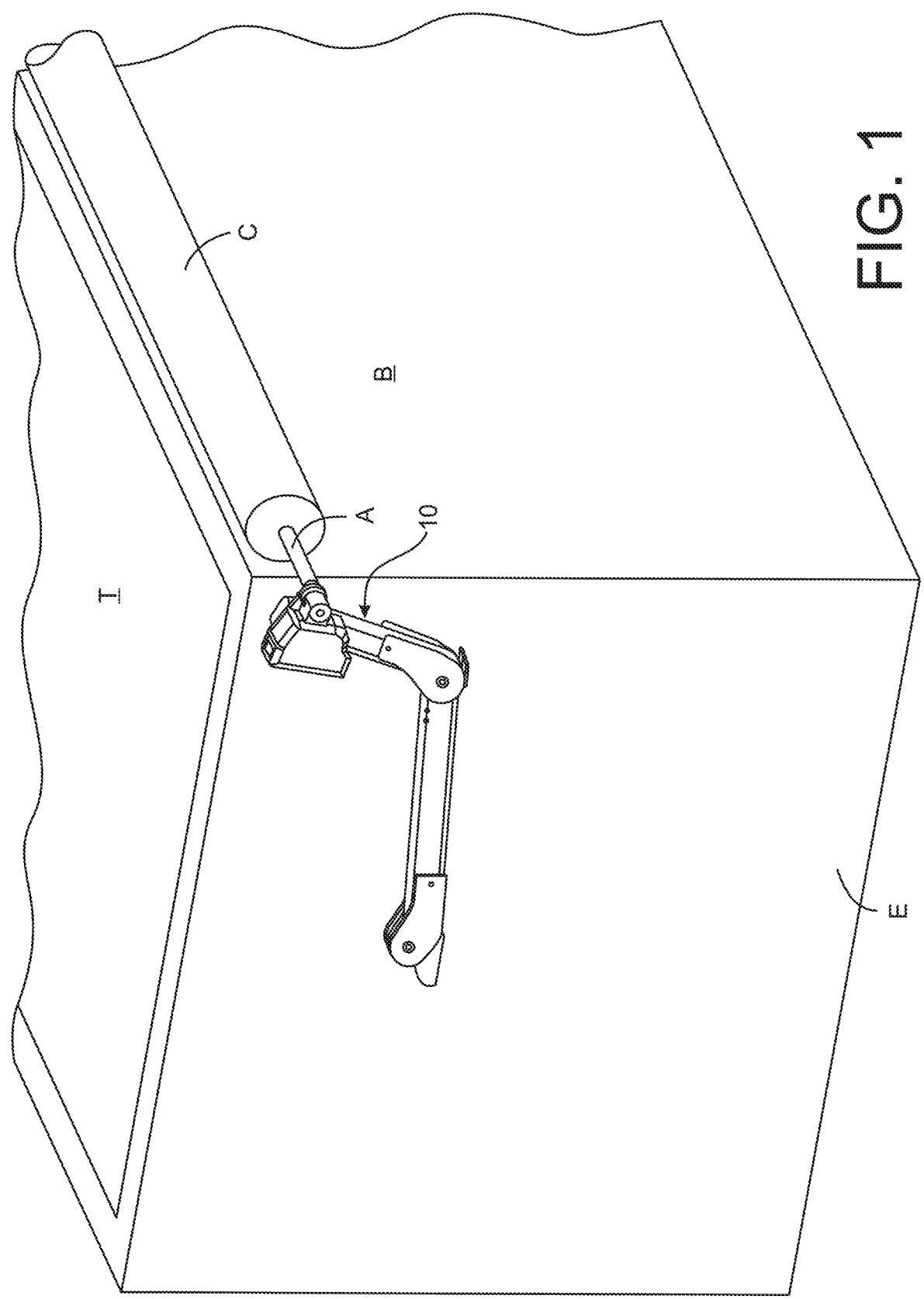
FIG. 1 is a perspective view of a container with an arm assembly for a side-to-sided cover system according to one aspect of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

FIG. 1 shows container body B having an open top T and an end wall E. A cover system includes a flexible cover C, such as a tarpaulin, for covering the open top T. In the illustrated embodiment, the cover C is part of a side-to-side cover system in which the cover is moved from its open position shown in FIG. 1, to a closed position extending across the top T of the container. The cover C is mounted on a roller that is rotated about an axle A. An arm assembly 10 is provided that is configured to control the movement of the cover C between the open and closed positions. In some systems, the axle A is manually rotated, with the movement of the cover being guided by arm assemblies 10 on the front and rear end walls of the container. However, for the purposes of the present disclosure, the axle A is motor driven, as described in more detail herein.

Figure 2:
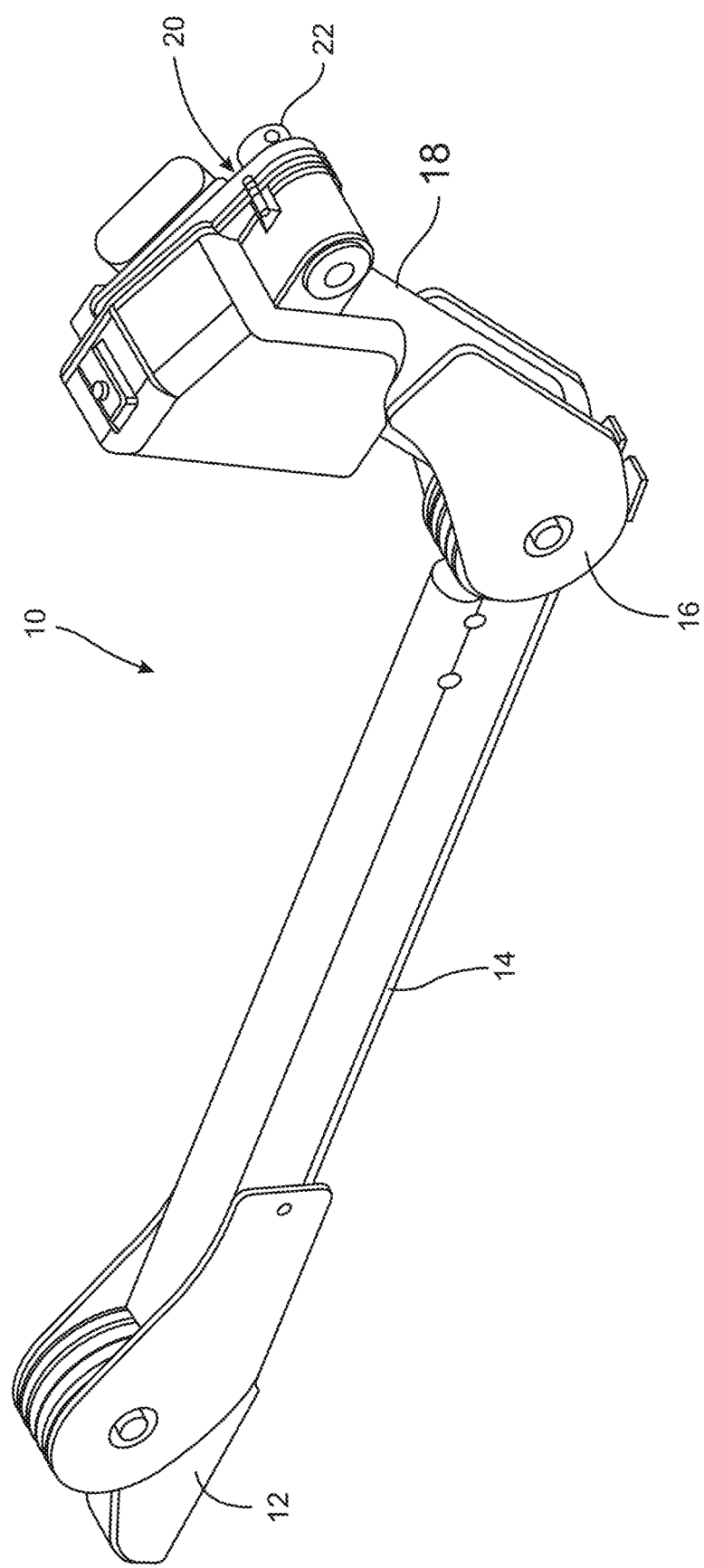
FIG. 2 is a perspective view of the arm assembly shown in FIG. 1, with the arm assembly in its closed position.
Figure 3:
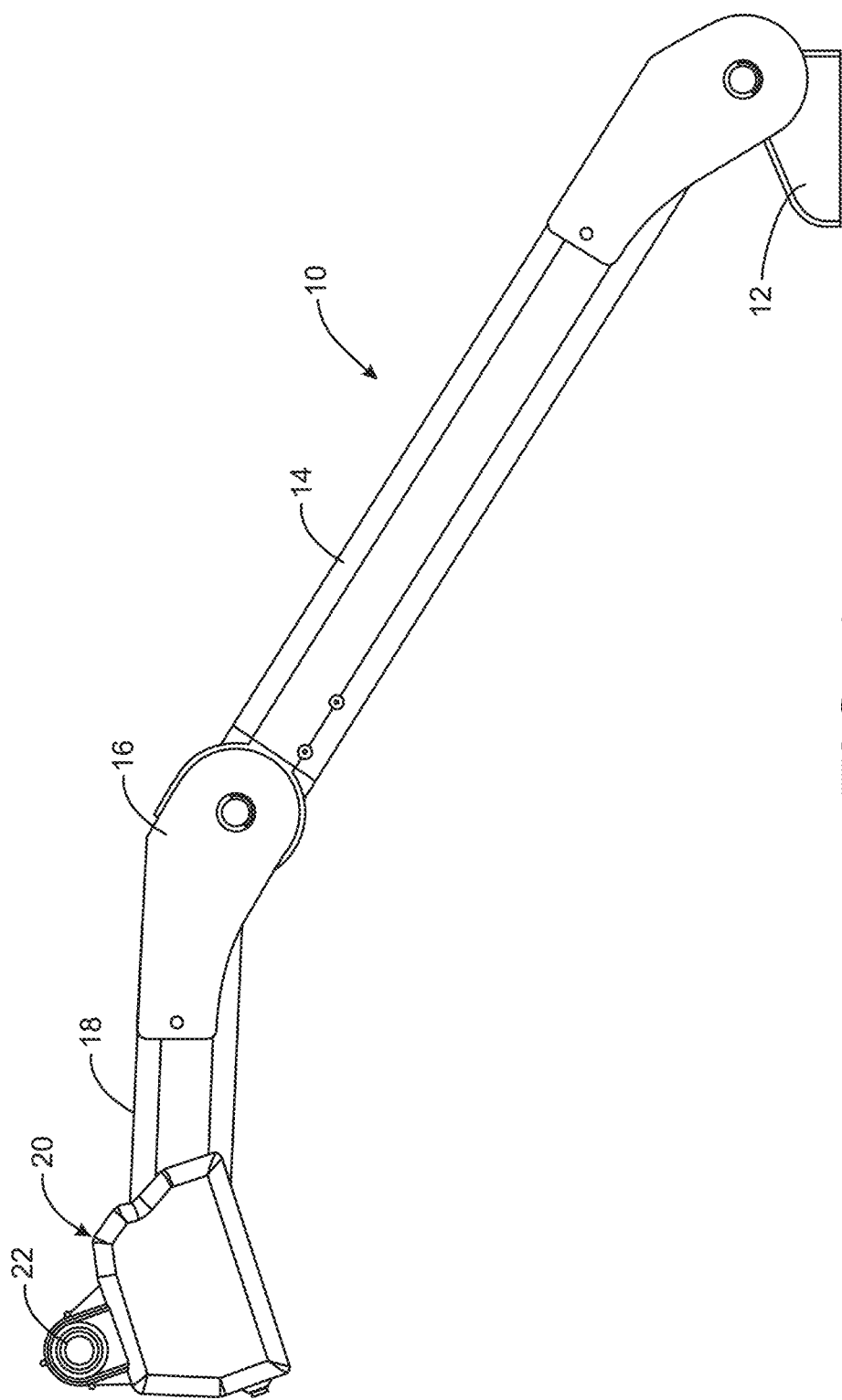
FIG. 3 is a side view of the arm assembly shown in FIG. 2 with the arm assembly in its open position.

As shown in FIGS. 2-3, the arm assembly 10 includes a base 12 adapted to be mounted to the container body, a lower arm 14 pivotably mounted to the base, a pivot joint 16, an upper arm 18 pivotably mounted to the pivot joint, and a motor assembly 20 with an axle collar 22 for engaging the axle A of the cover roller. The arm assembly 10 is thus configured to operate in a known manner as the arm pivots from the closed position shown in FIG. 2 to its open position shown in FIG. 3. The lower arm 14 thus pivots about the base 12 to sweep the arm assembly across the end wall E of the container, and the upper arm 18 pivots about pivot joint 16 to maintain the axle A in close proximity to the top of the container body B.

Figure 5:
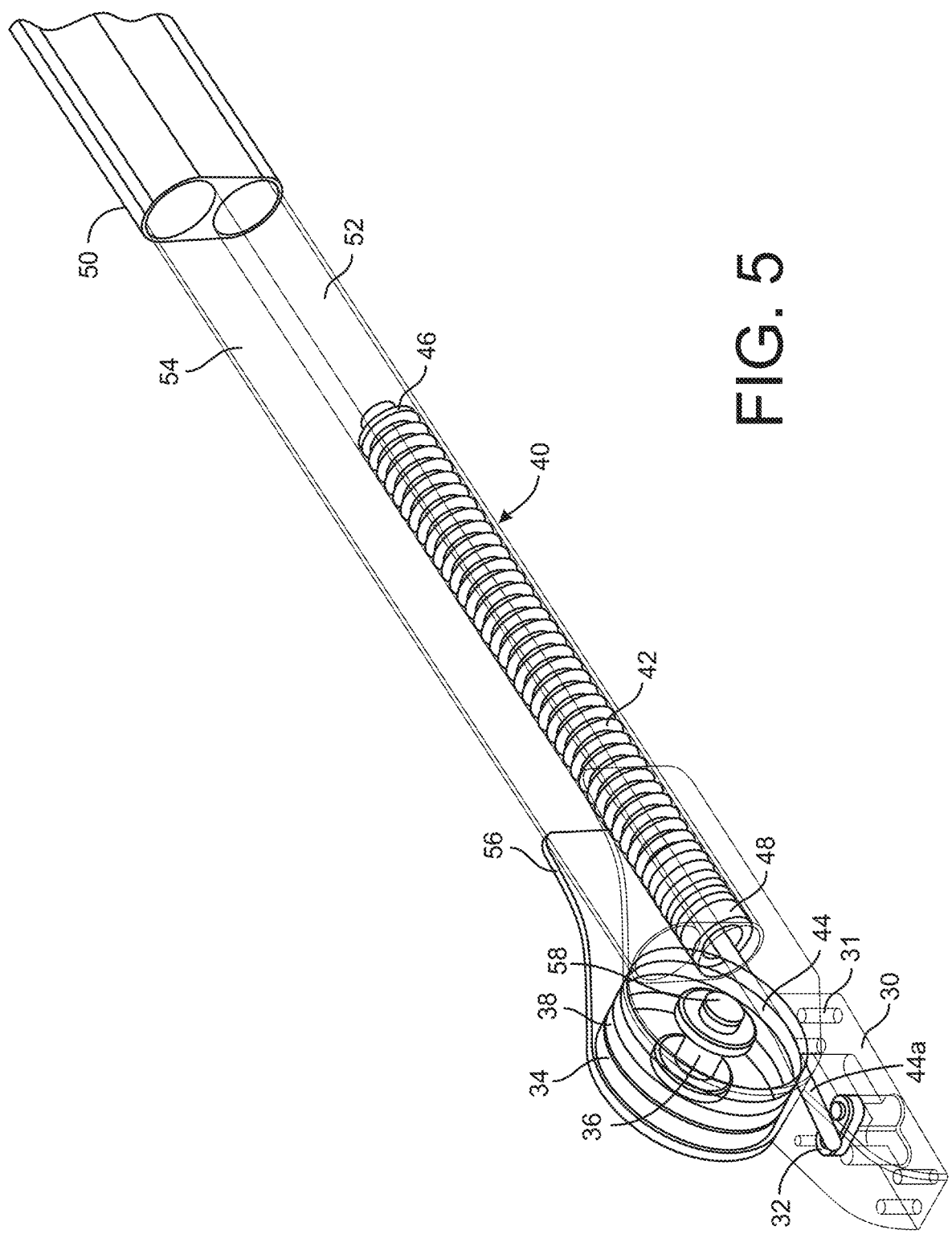
FIG. 5 is an enlarged cut-away view of the lower arm of the arm assembly shown in FIG. 4.
Figure 6:
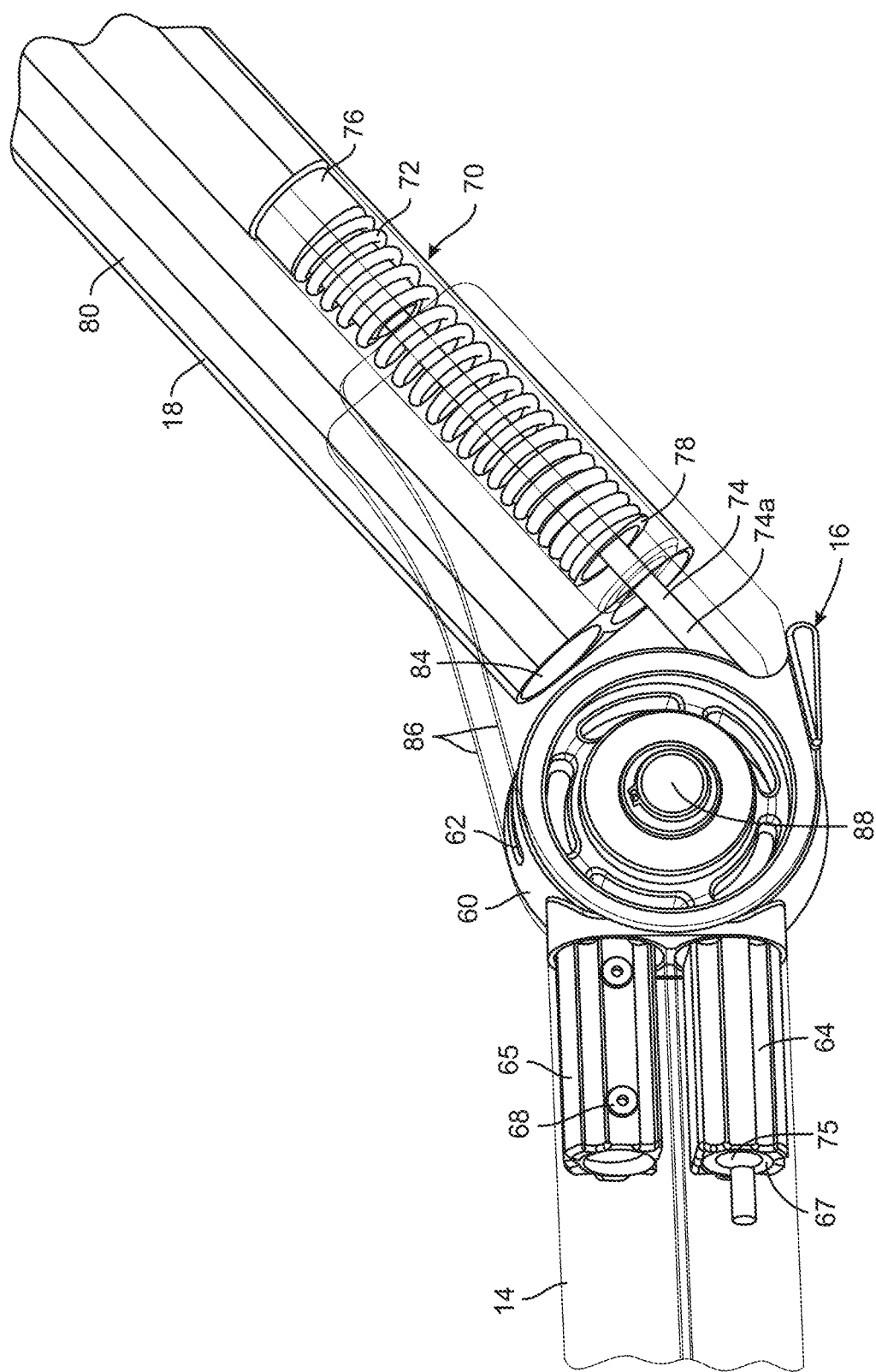
FIG. 6 is an enlarged cut-away view of the pivot joint of the arm assembly shown in FIG. 4.
Figure 7:
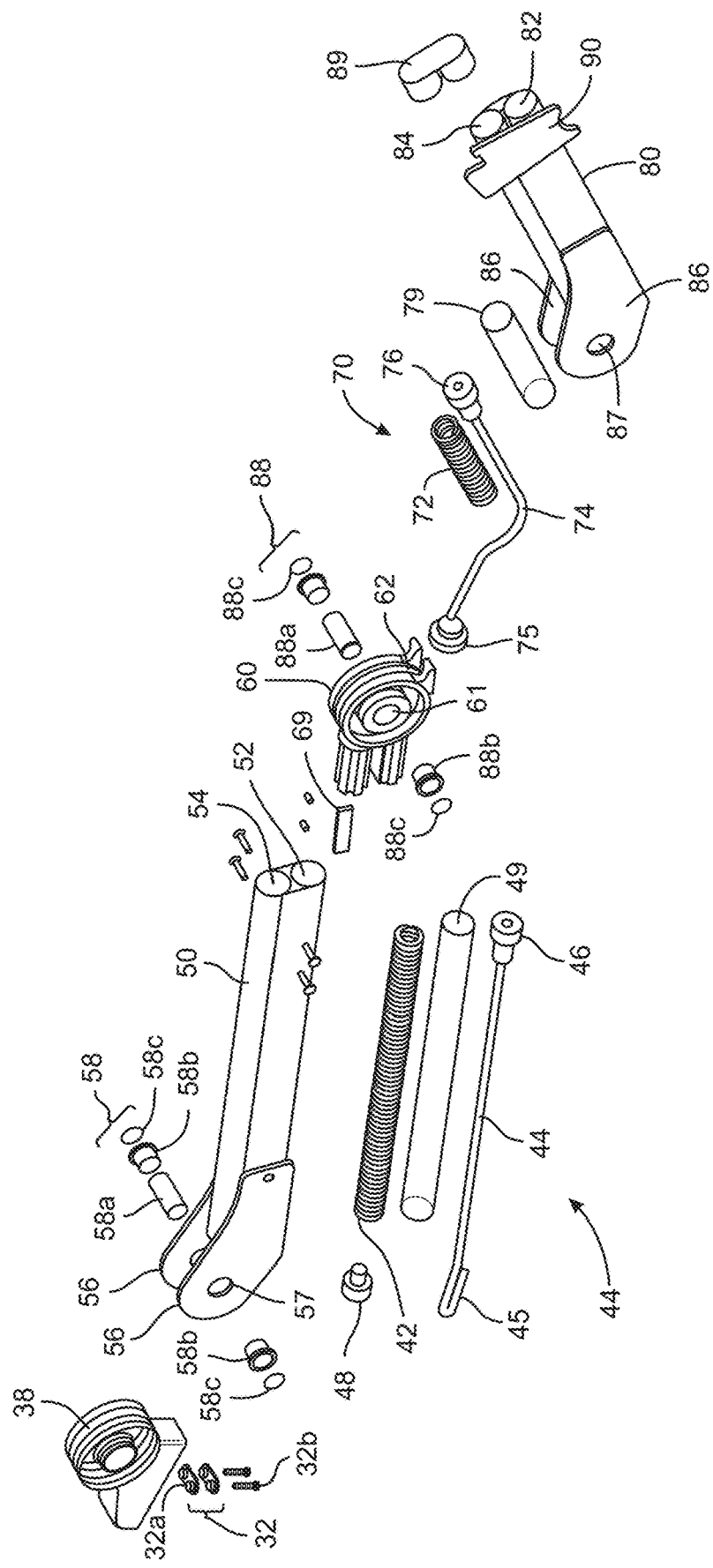
FIG. 7 is an exploded view of the arm assembly shown in FIG. 4.

The arm assembly 10 of the present disclosure thus operates in a known manner to move the cover C side-to-side across the open top T of the container body B. The conventional arm assembly for a flexible cover system relies on torsion springs coupled between the base and the lower arm to provide a return force to return the cover system to its closed position. The arm assembly 10 of the present disclosure relies on compression springs to generate the torque profile for the cover system. As shown in FIGS. 4-7, the arm assembly 10 includes a base body 30 that is adapted to be mounted to the container body B via mounting holes 31 in a known manner, depending upon the nature of the cover system—i.e., side-to-side, end-to-end, sliding mount, etc. The base body 30 includes a cable mount 32 for engaging the end 45 of a cable 44. In one embodiment, the cable mount includes opposing clamping plates 32a (FIG. 7) clamped together about the cable by screws 32b. The end 45 of the cable 44 may be bent, as shown in FIG. 7 to enhance the engagement with the cable mount 32. Other forms of cable mount 32 are contemplated that are capable of clamping and retaining the end of the cable 44 during the loading and unloading of the arm assembly 10. For instance, a ball or similar body may be crimped or welded onto the end of the cable with the ball sized to prevent its removal from the base body. The cable mount may be configured to permit adjustment of the cable within the base body 30 or may be configured to provide a fixed, non-adjustable cable length.

The base body 30 further includes a pulley 34 fixed to the base body. The pulley 34 defines a pivot bore 36 therethrough by which the lower arm 14 of the arm assembly is pivotably mounted, as described in more detail herein. The pulley 34 further defines a groove 38 in the outer surface or perimeter of the pulley that is sized to receive the cable 44, and particularly a wrap length 44a of the cable as the cable wraps partially around the stationary pulley 34, again as described in more detail herein.

The arm assembly 10 includes a lower force mechanism 40 that is adapted to apply force to provide rotational movement to the lower arm 14. In accordance with one feature of the present disclosure, the force mechanism stores energy upon movement of the arm assembly in one direction, and releases the stored energy to move the arm assembly in an opposite direction. In one embodiment, the force mechanism includes a compression spring 42 that is contained within a lower arm housing 50 that stores energy on compression of the spring. The cable 44 extends through the center of the compression spring 42 and is constrained against the outboard end of the spring by an end cap 46. The opposite inboard end of the spring 42 is fixed to the housing 50 by a spring base 48. A sheath 49 surrounds the spring to reduce the friction between the spring and the inner wall of the housing 50.

Figure 8:
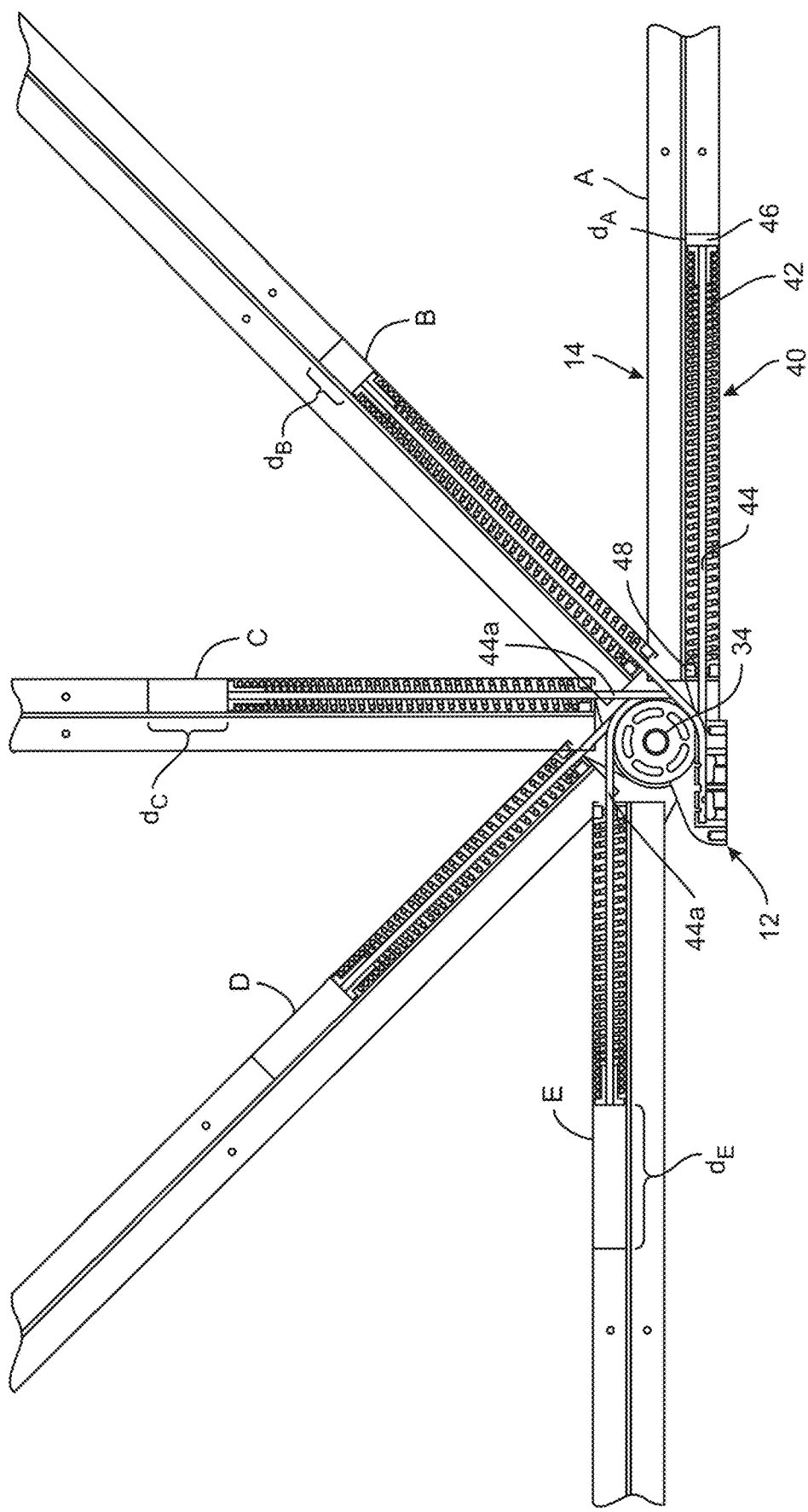
FIG. 8 is a side view showing the lower arm of the arm assembly shown in FIG. 4, depicting the arm in different positions between its closed position and its open position.

The operation of the lower force mechanism 40 is illustrated in FIG. 8. The lower arm 14 is shown in five positions, from position A in which the cover is deployed over the top of the container, to the position E in which the lower arm 14 has been pulled to the retracted, or open, position. As can be seen in FIG. 8, as the lower arm 14 pivots relative to the pulley 34, the wrap length 44a of the cable 44 wraps around successively more of the circumference of the pulley 34. At the same time, the distance d of the end cap 46 from its initial position $d_A$ increases at each stage B-E. As can be appreciated, as the distance d increases the spring 42 is increasingly compressed between the moving end cap 46 and the fixed spring base 48. As the spring is compressed, the potential energy stored in the spring increases to its maximum value at the distance $d_E$. In one embodiment, the maximum travel can be about eight inches. In certain embodiments, each compression spring 42 can provide 2000 pounds of force at this maximum compression travel distance.

When the cover C is to be deployed, the lower arm 14 is permitted to pivot relative to the base 12 under operation of the spring 42 as it releases the stored energy. This energy release manifests itself as a force as the cable 44 unwinds about the circumference of the pulley 34 (or more correctly the circumference of the cable groove 38) to pivot the lower arm 14.

Figure 4:
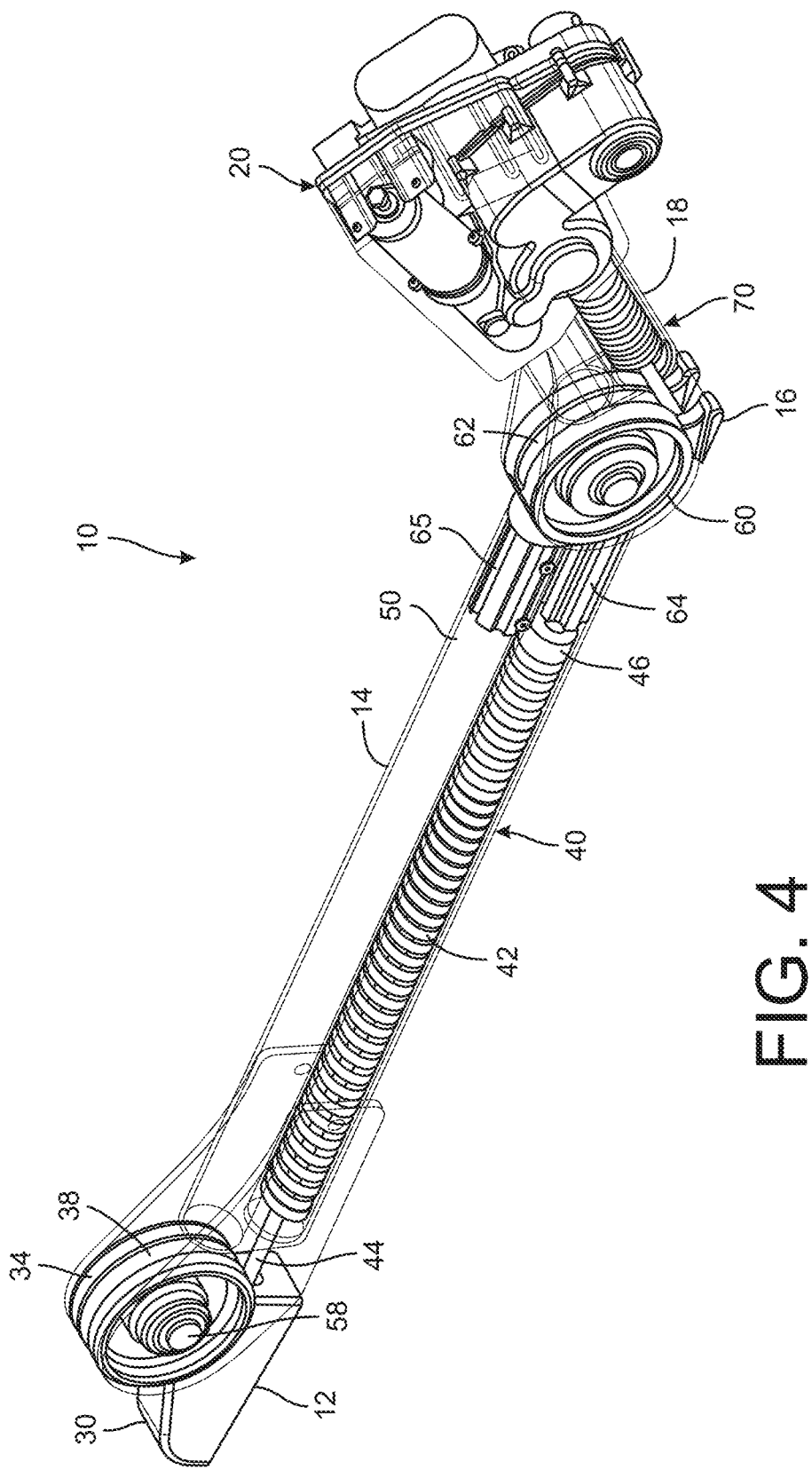
FIG. 4 is a perspective cut-away view of the arm assembly shown in FIG. 2.

It can be appreciated that the force mechanism 40 of the present disclosure can be readily modified to generate a wide range of force profiles. For instance, while a single spring 42 is shown in FIGS. 4-5, multiple compression springs can be stacked within the housing 50, with the springs have the same or different spring constants. The cable 44 would be appropriately sized to extend through the stacked springs. In the illustrated embodiments, the force mechanism 40 (as well as the upper mechanism 70) incorporates a compression coil spring. The spring 42 can be pre-loaded within the housing 50 as desired to achieve particular forces or rotational angles of the lower arm 14. The pre-loading can be accomplished by an adjustable spring base 48 or by adjusting the engagement between the cable 44 and the cable mount 32. It is further contemplated that the force mechanism can incorporate a gas spring in lieu of the compression spring(s) in which the gas spring stores energy on compression of the gas and releases the stored energy to move the arm.

Figure 9C:
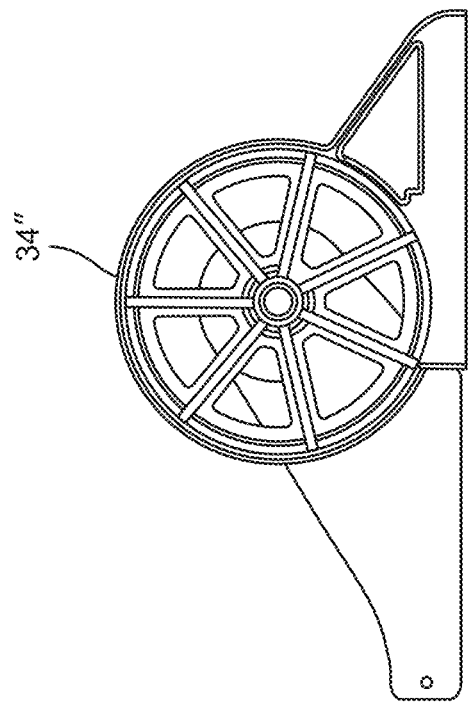
FIGS. 9A, 9B and 9C are side views of different pulleys for use with the arm assembly shown in FIG. 4.
Figure 9B:
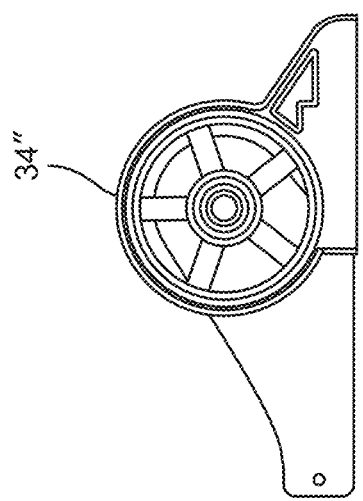
Figure 9A:
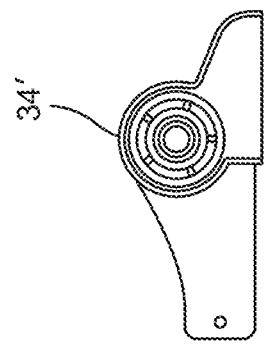

As shown in FIGS. 9A-9C, three different pulleys 34', 34", 34''' have increasingly larger outer diameters and thus increasingly larger circumferences for the cable 44 to wrap around as the lower arm is pivoted. Obviously, a cable wrapped around the smaller pulley 34' compresses the spring 42 less than a cable wrapped around the larger pulley 34'''. Pulley sizes can be based on available spring compression. For instance, in one embodiment, each additional spring can provide an additional eight inches of compression. The additional pulley size and spring or springs also dictates different offsets of the force mechanism. Spring force multiplied by offset provides the required force to move the pivot arms. Longer arms require more force. Since the amount of compression and offset determines the amount of stored energy in the spring, the force generation capability of the mechanism 40 can be adjusted by selecting the appropriate pulley diameter and spring count.

In the illustrated embodiments, the force mechanism utilizes compression coil springs. Other elastic or resiliently compressible elements or biasing elements are contemplated that are capable of storing and releasing elastic energy by compression. For instance, compressible elastic bushings may be implemented in the force mechanism. Gas springs can also be used in lieu of the compression coil springs, as discussed above.

Figure 10C:
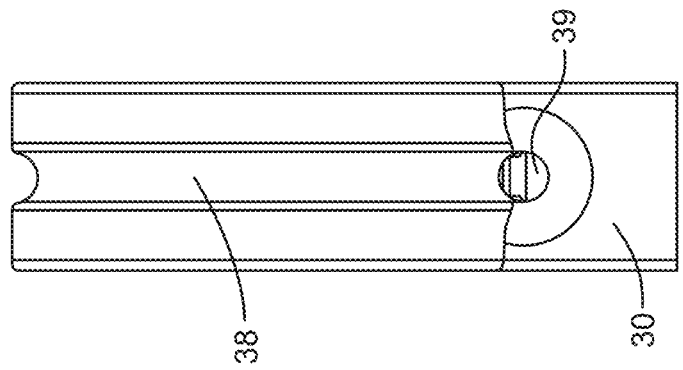
FIGS. 10A, 10B and 10C are side, top and end views of a pulley used in the arm assembly shown in FIG. 4.
Figure 10A:
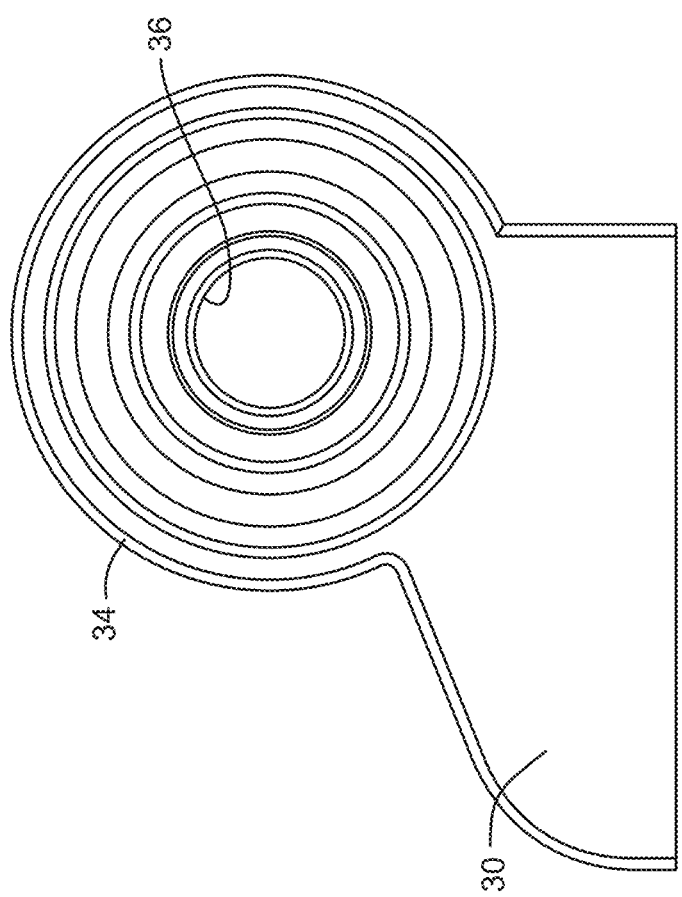
Figure 10B:
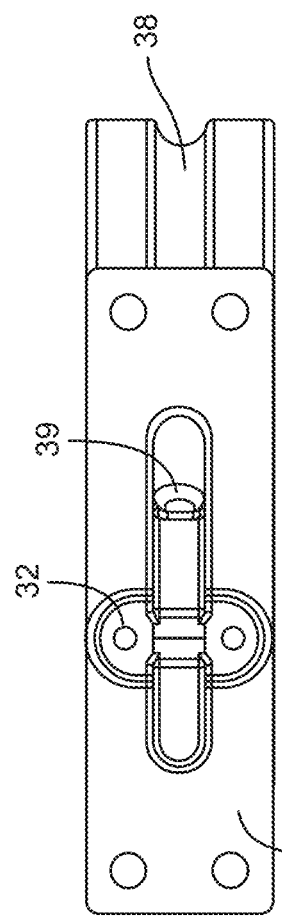

The pulleys 34 shown in FIGS. 9A-9C can be formed as an integral body with the base body 30, as shown in FIGS. 10A-10C. The cable groove 38 is formed in the outer circumference of the cylindrical body of the pulley 34. A cable opening 39 is aligned with the cable groove to provide access to the cable mount 32 within the base body 30. The pulleys in the illustrated embodiments define a circular outer perimeter so that the cable groove 38 is at a defined radius or diameter. However, the outer perimeter, and particularly the groove, can be non-circular, such as slightly elliptical, in order to generate a modified force and rotation profile for movement of the arm assembly.

Figure 11:
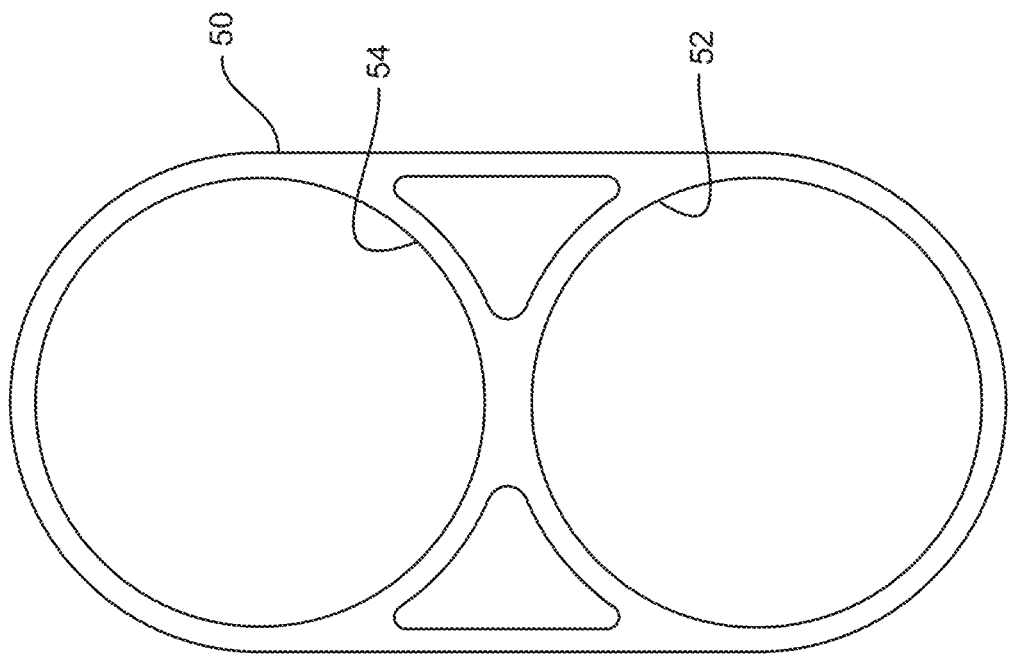
FIG. 11 is an end view of the lower arm housing for the lower arm shown in FIG. 5.
Figure 12C:
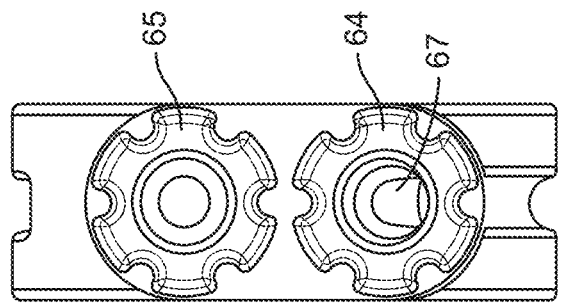
FIGS. 12A, 12B and 12C are side, top and end views of the pivot pulley for the pivot joint shown in FIG. 6.
Figure 12A:
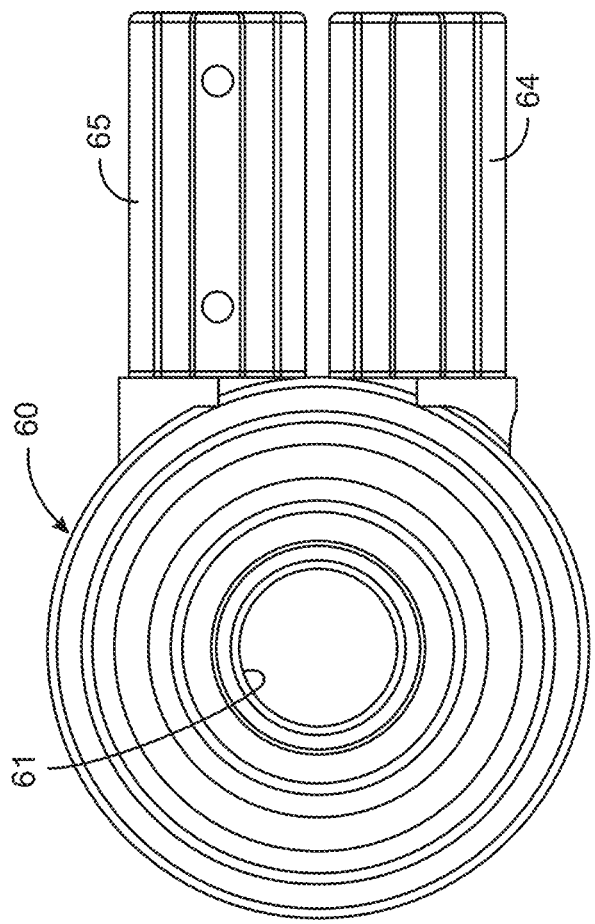
Figure 12B:
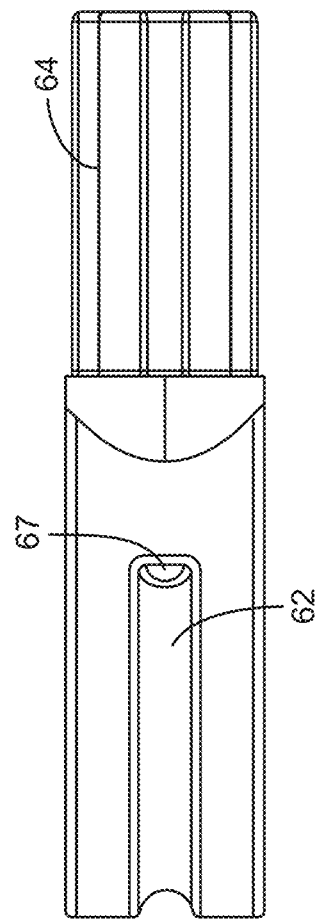

The lower arm housing 50 can be formed as an extrusion, as illustrated in FIGS. 5 and 11. The housing includes a spring bore 52 within which the spring 42 and spring sheath 49 are positioned. The spring base 48 at the inboard end of the compression spring 42 can be fastened to the walls of the spring bore 52 in a conventional fashion, such as by welding. The housing further includes a secondary bore 54 that is used for engagement to the pivot joint 16, as described herein. The housing 50 can be affixed to the base 12 by a pivot mount 58 extending through openings 57 in a pair of mounting plates 56, as shown in FIG. 7. The pivot mount 58 can include a pin 58a, end bushings 58b and retaining rings 58c configured to allow the mounting plates 56, and thus the lower arm 14, to freely pivot or rotate relative to the base 12. The bushings 58b may incorporate or be replaced with a ball bearing assembly to reduce the pivot friction.

The pivot joint 16 incorporates a pivot pulley 60 that can be configured similar to the pulley 34. In particular, as illustrated in FIGS. 6-7 and 12A-12C, the pivot pulley 60 includes a pivot bore 61 and a cable groove 62 sized to receive a cable 74 that is integrated into the upper arm 18. However, unlike the pulley 34 that is integrated into a base body 30, the pivot pulley 60 is provided with structure to mate with the lower arm housing 50. In particular, the pivot pulley 60 includes a pair of mounting stems 64, 65 that are configured for a tight fit within a corresponding one of the bores 52, 54 in the lower arm housing 50. Mounting screws 58 are used to fasten only one stem 65 to the secondary bore 54 of the housing 50. A mounting plate 69 may extend through a central bore in the mounting stem 65 for engagement with the mounting screws 58. The other stem 64 is provided with a cable bore 67 for mounting an end of the cable 74.

The upper arm 18 includes its own upper force mechanism 70 that can be similar to the mechanism 40. In one embodiment, the upper force mechanism 70 utilizes the cable 74 in the same manner as the cable 44 in the lower torque mechanism 40. The upper force mechanism 70 further includes a compression spring 72 that is disposed within an upper arm housing 80, as shown in FIG. 6. The cable 74 may be fastened to the mounting stem 64 by a clamping plate 69 and set screws 75. The clamping plate 69 may include a groove for receiving the cable and pressing the cable against the inner wall of the mounting stem 64. Other means for mounting the cable within the mounting stem 64 are contemplated that are capable of clamping and retaining the end of the cable 74 during the loading and unloading of the arm assembly 10. For instance, a ball or similar body may be crimped or welded onto the end of the cable with the ball sized to prevent its removal mounting stem 64. The cable mount may be configured to permit adjustment of the cable within mounting stem 64 or may be configured to provide a fixed, non-adjustable cable length.

A second end cap 76 is affixed to the opposite end of the cable for contacting the outboard end of the compression spring 72. The spring is contained between the end cap 76 and a spring base 78 that is affixed to the upper arm housing 80 in a manner similar to the spring base 48 of the lower force mechanism. A spring sheath 79 reduces friction between the spring and the inside wall of the upper housing as the spring compresses and expands.

The cable passes through a cable bore 67 in the pivot pulley 60 and through the mounting stem 74 for engagement with the end cap 75. The cable includes a wrap length 74a that is positioned to wrap around the circumference of the pivot pulley 60, or more particularly the cable groove 62. The upper force mechanism 70 thus operates in the same manner as the lower force mechanism 40, namely with the cable wrapping around the pulley as the upper arm 18 is pivoted or rotated relative to the pivot joint 16. Although the pivot joint 16 pivots with the lower arm 14, the pivot joint is fixed in relation to the upper arm 18. As the arm assembly 10 is retracted, the upper arm 18 will pivot to its limit along with the lower arm 14.

The upper arm housing 80 is similar in construction to the lower arm housing 50. Thus, the upper arm housing includes a spring bore 82 within which the force mechanism 70 resides, and a secondary bore 84. The open ends of the bores can be closed with a plug 89, or can be used for mounting other components, such as the motor assembly 20. A separate mounting plate 90 can also be provided for mounting other components thereto. The upper arm housing 80 includes a pair of mounting plates 86 defining pivot openings 87 for receiving the pivot pin 88. The pivot pin 88 extends through the mounting plates 86 and the pivot bore 61 in the pivot pulley 60, and may be configured like the pivot mount 58 of the lower arm. The upper arm 18 is thus free to pivot or rotate relative to the pivot pulley 60.

Figure 13A:
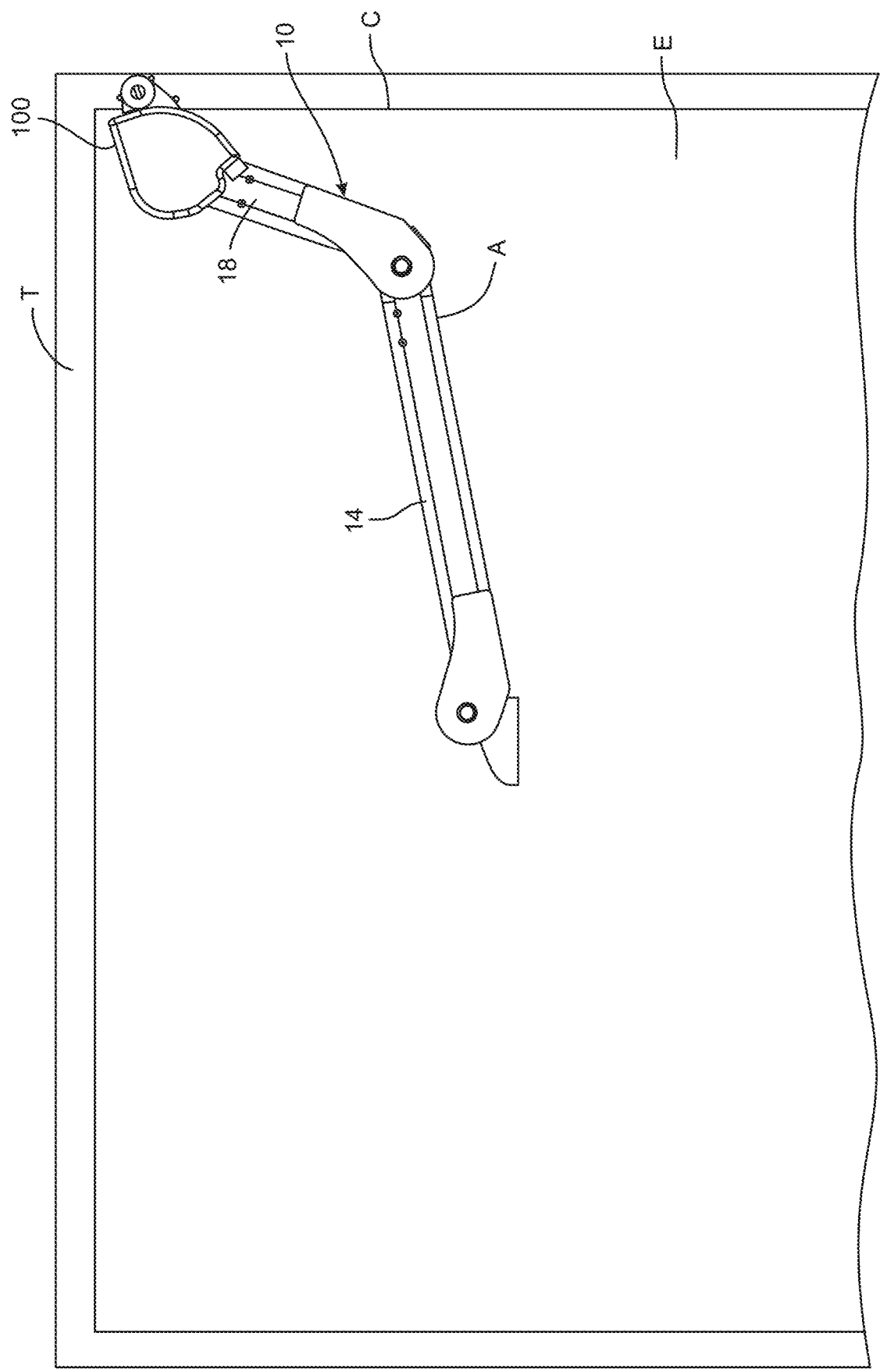
FIGS. 13A, 13B and 13C are end views of the container shown in FIG. 1 with the arm assembly of the present disclosure in its closed, intermediate and open positions.
Figure 13B:
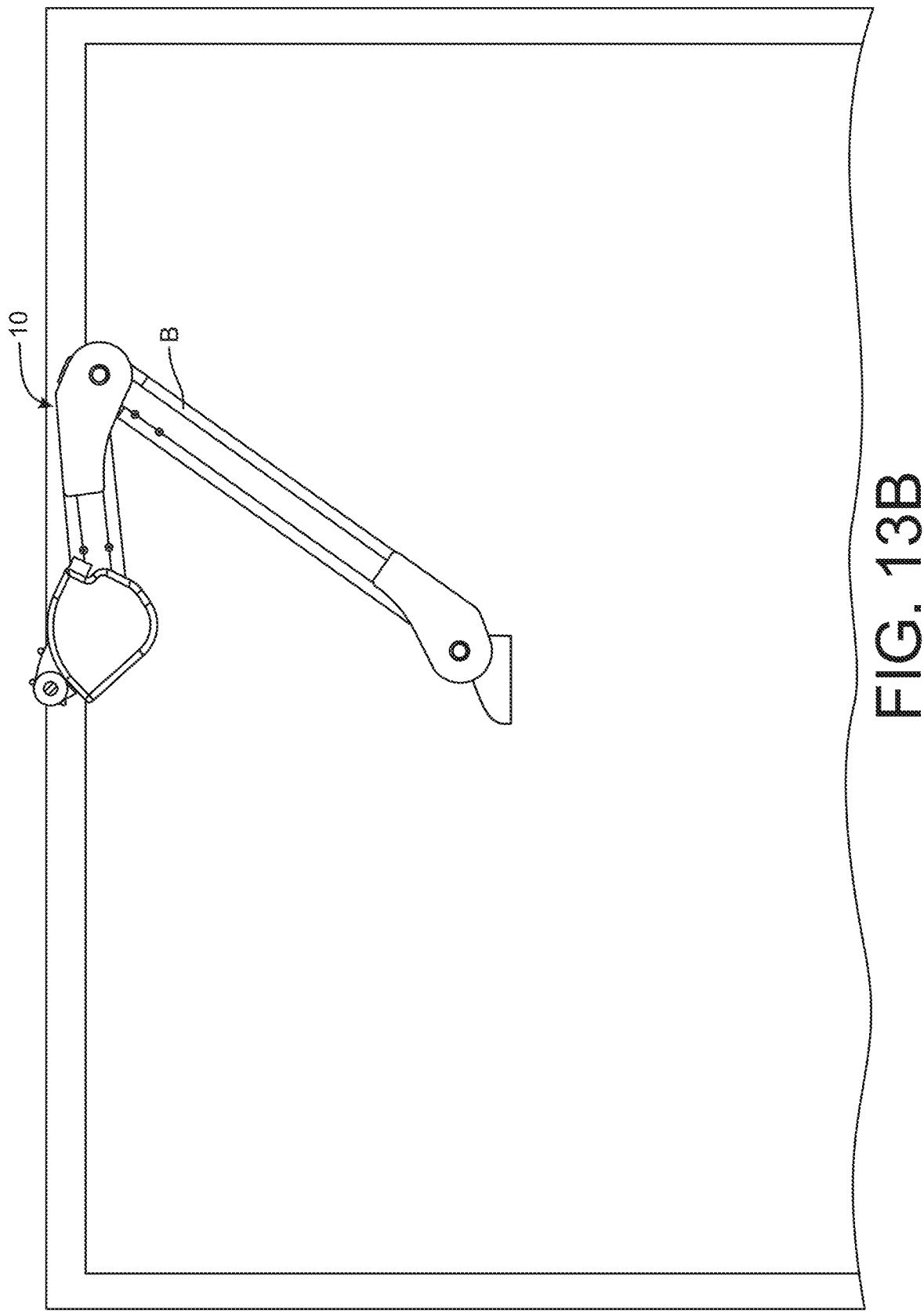
Figure 13C:
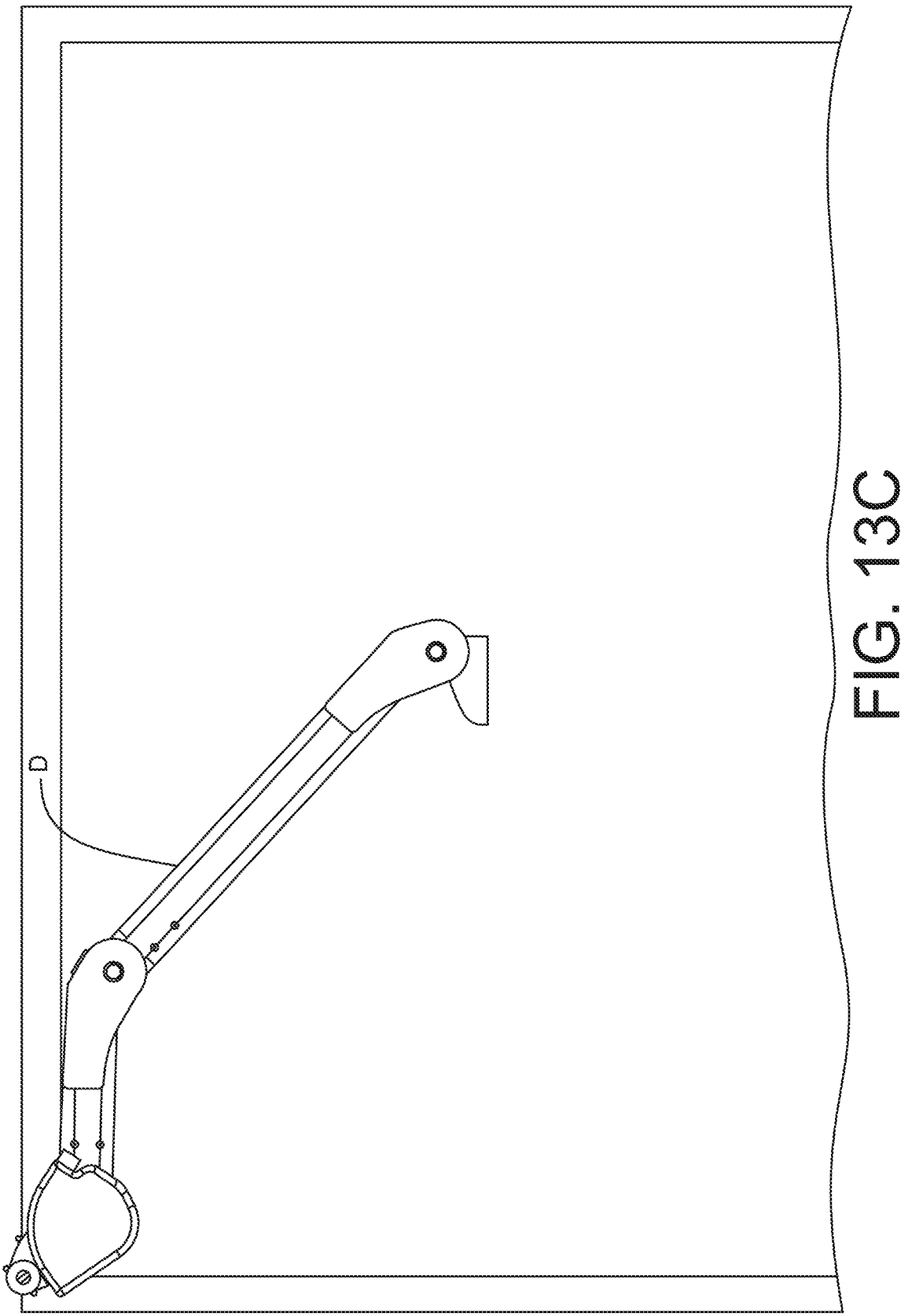

FIGS. 13A-13C show an arm assembly 10 with an alternative motor assembly 100 mounted to the end of the upper arm. The arm assembly is shown in three positions A, B and D depicted in FIG. 8 to illustrate the orientation of the arm assembly and motor assembly relative to the end wall E of the container C. It can be seen that the lower arm pivots through a much greater angle than the upper arm and that the lower arm tends to pivot after the lower arm has swept through a certain angle. It should be appreciated that the force mechanisms 40 and 70 can be tailored to achieve any desired force and rotation profile by selecting the number and stiffness of the compression springs as well as the diameters of the pulleys.

Figure 14:
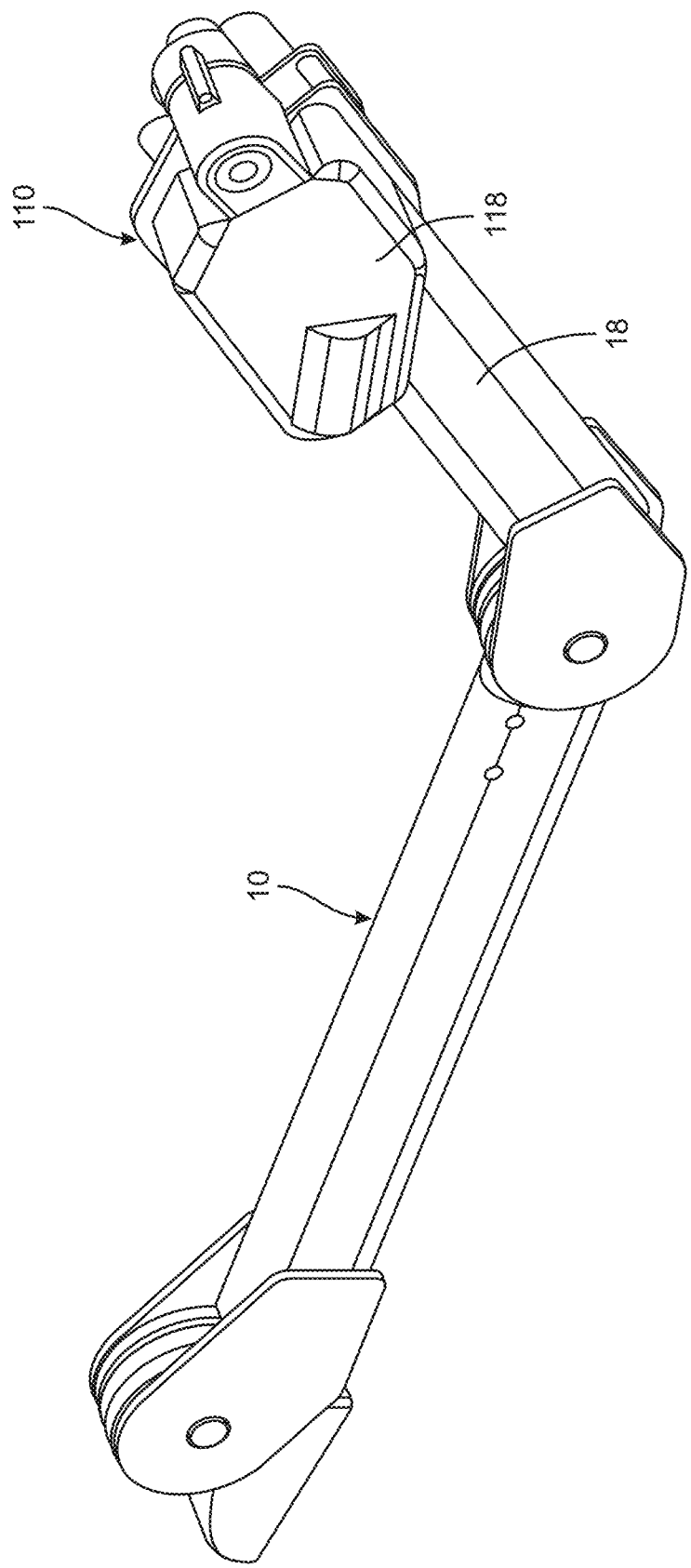
FIG. 14 is a perspective view of an arm assembly carrying an alternative motor assembly according to a further aspect of the present disclosure.
Figure 15:
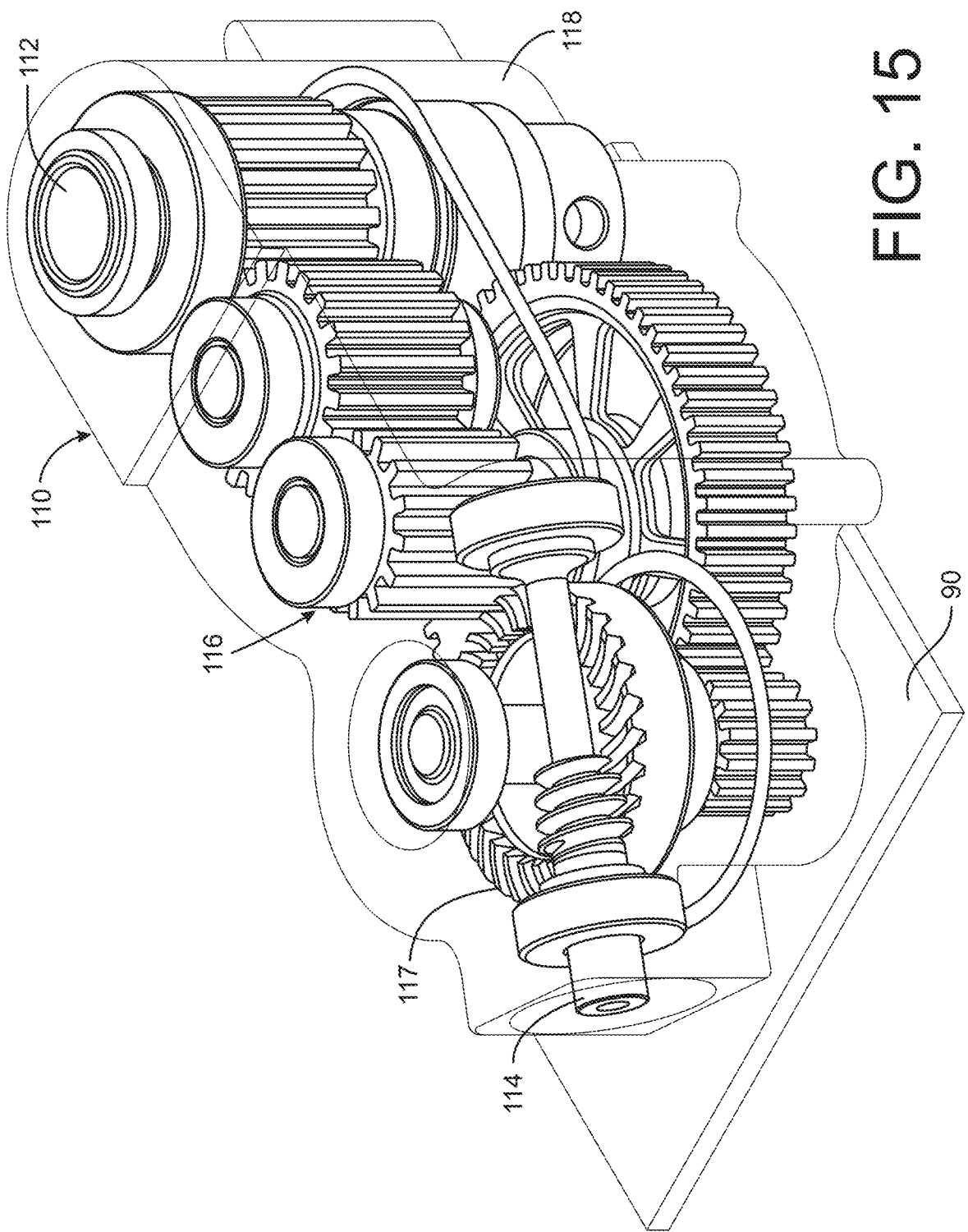
FIG. 15 is a top perspective cut-away view of a motor assembly to be carried by the arm assembly shown in FIG. 14.
Figure 16:
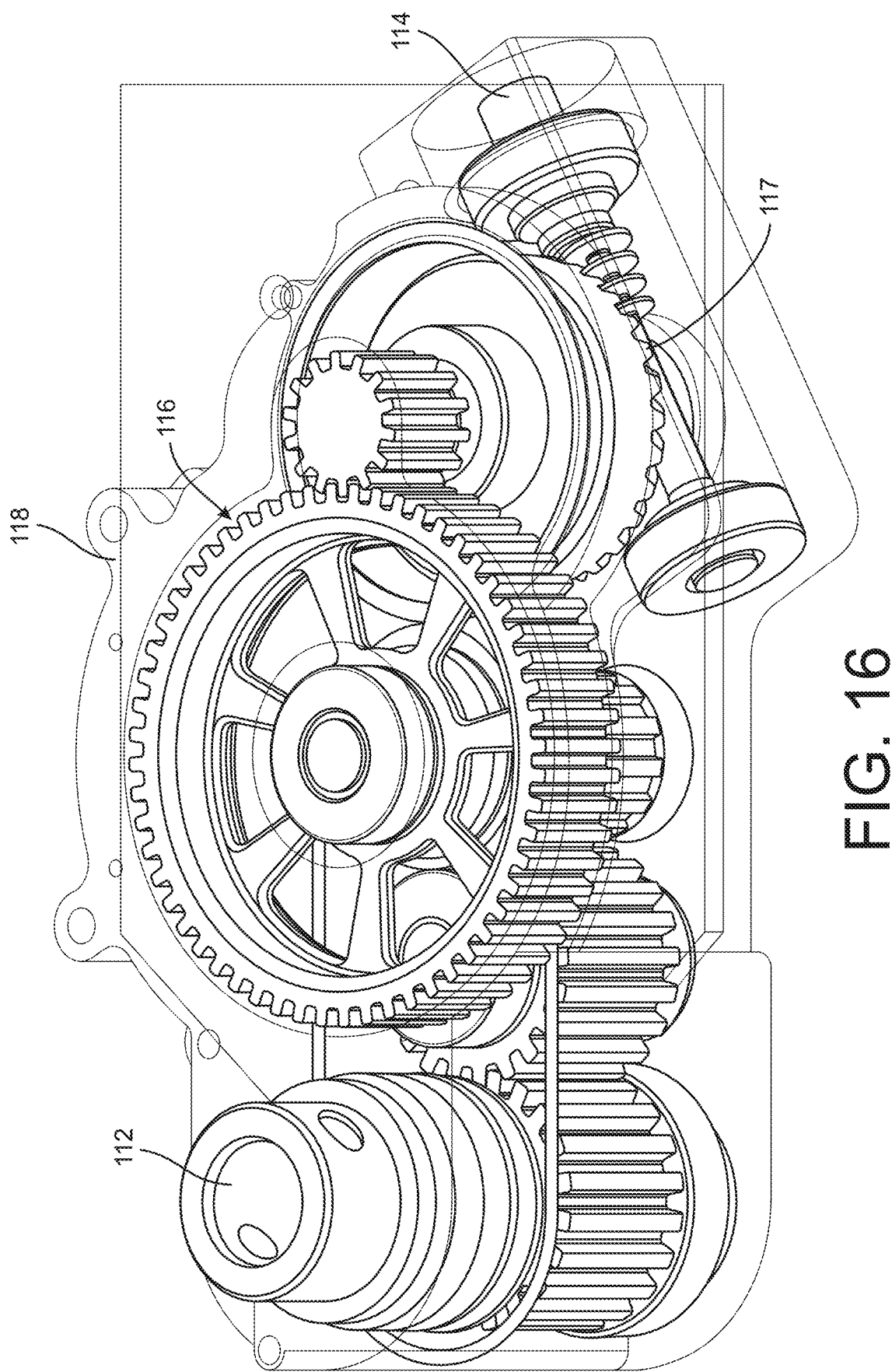
FIG. 16 is a bottom perspective cut-away view of a motor assembly shown in FIG. 15.
Figure 17:
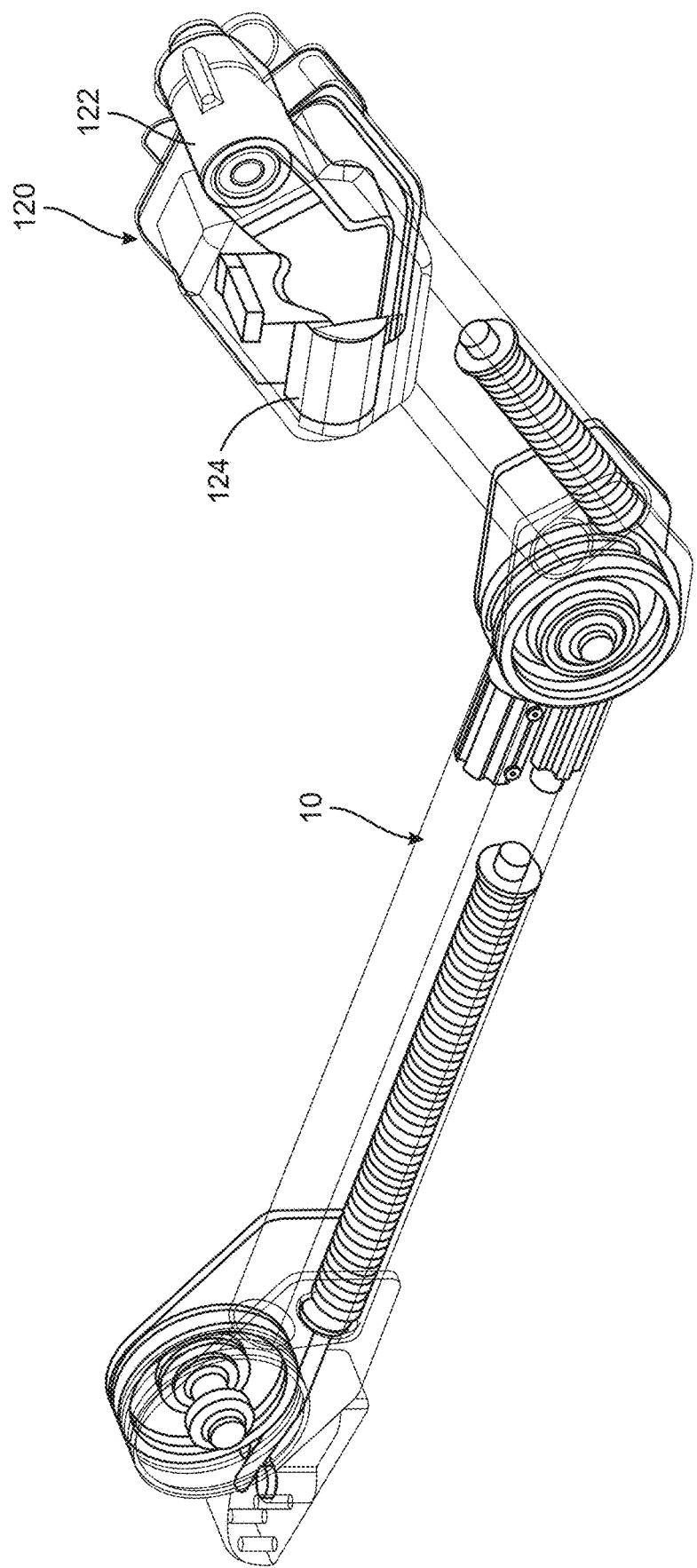
FIG. 17 is perspective cut-away view of an arm assembly carrying another motor assembly according to a further aspect of the present disclosure.

An arm assembly with another motor assembly 110 is shown in FIG. 14, with details of the motor assembly depicted in FIGS. 15-16. The motor assembly 110 includes a housing 114 that is mounted to the upper arm 18, such as by the mounting plate 90. The assembly includes an axle collar 112 that mates the axle A of the cover system C, as discussed above. An input shaft 114 is provided to mate with a motor, and a reduction gear train 116 transmits rotation and torque from the input shaft to the axle collar. The gear train may incorporate a hypoid gear interface 117 at the input shaft 118. FIG. 17 illustrates an arm assembly carrying a motor assembly 120 that includes the motor 124 within the housing 122.

Figure 18:
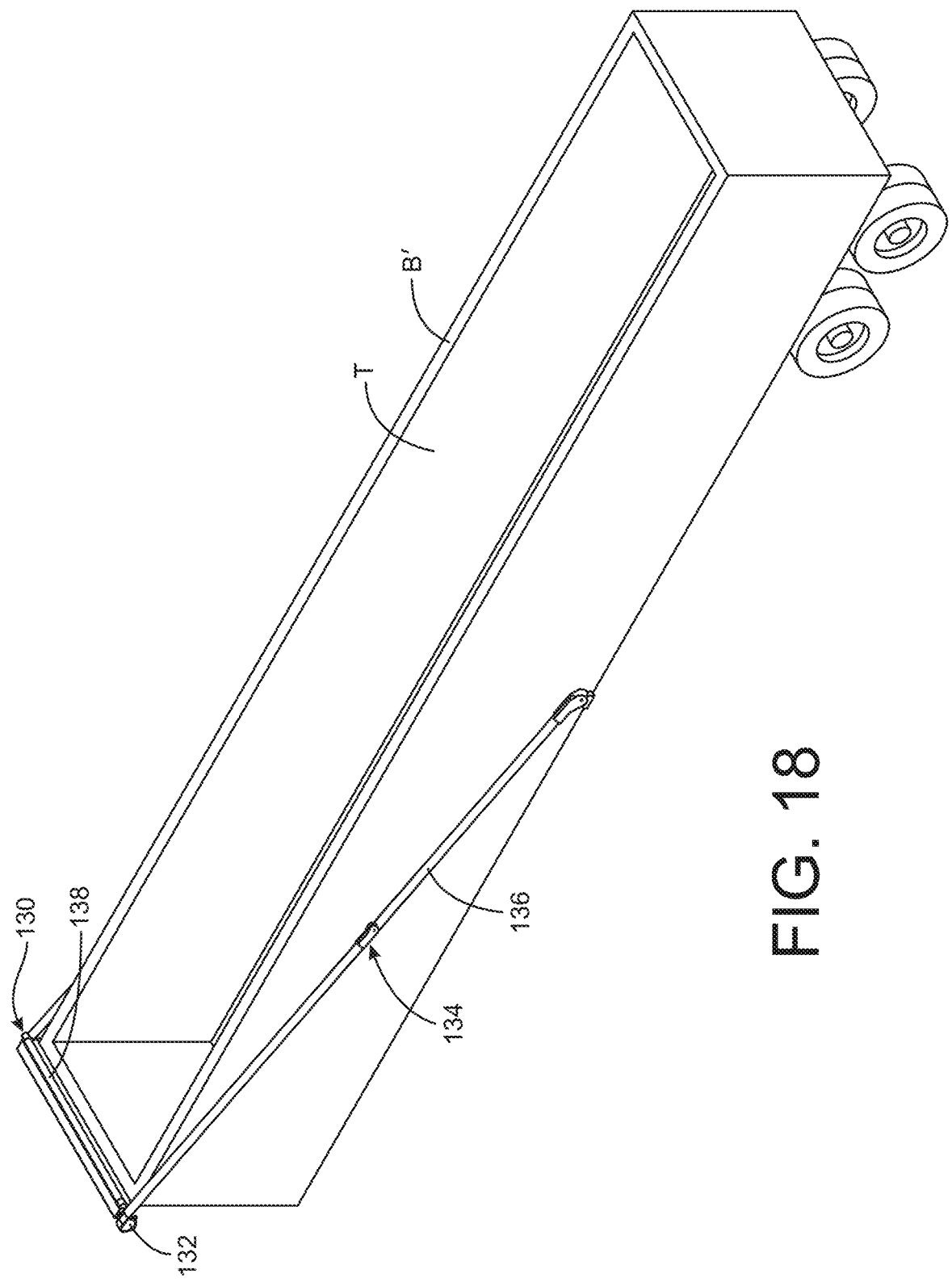
FIG. 18 is perspective view of an arm assembly for a cover system according to a further embodiment of the present disclosure.

The force mechanism 40 can be incorporated into an end-to-end cover assembly 130, such as shown in FIG. 18. The cover is retracted into a housing 132 at one end of the trailer body B'. A bail arm assembly 134 includes bail arms 136 on opposite sides of the body, with a cross bar 138 spanning the open top T and configured to engage one end of the flexible cover. As shown in more detail in FIG. 19, the bail arm 136 can incorporate a torque mechanism 140 that includes multiple compression springs 142 stacked along the length of the housing 137. A cable 144 extends along the length of the stacked springs and is fixed to the pulley 148 in the manner described above. A sheath 146 encases the stacked springs.

Figure 19:
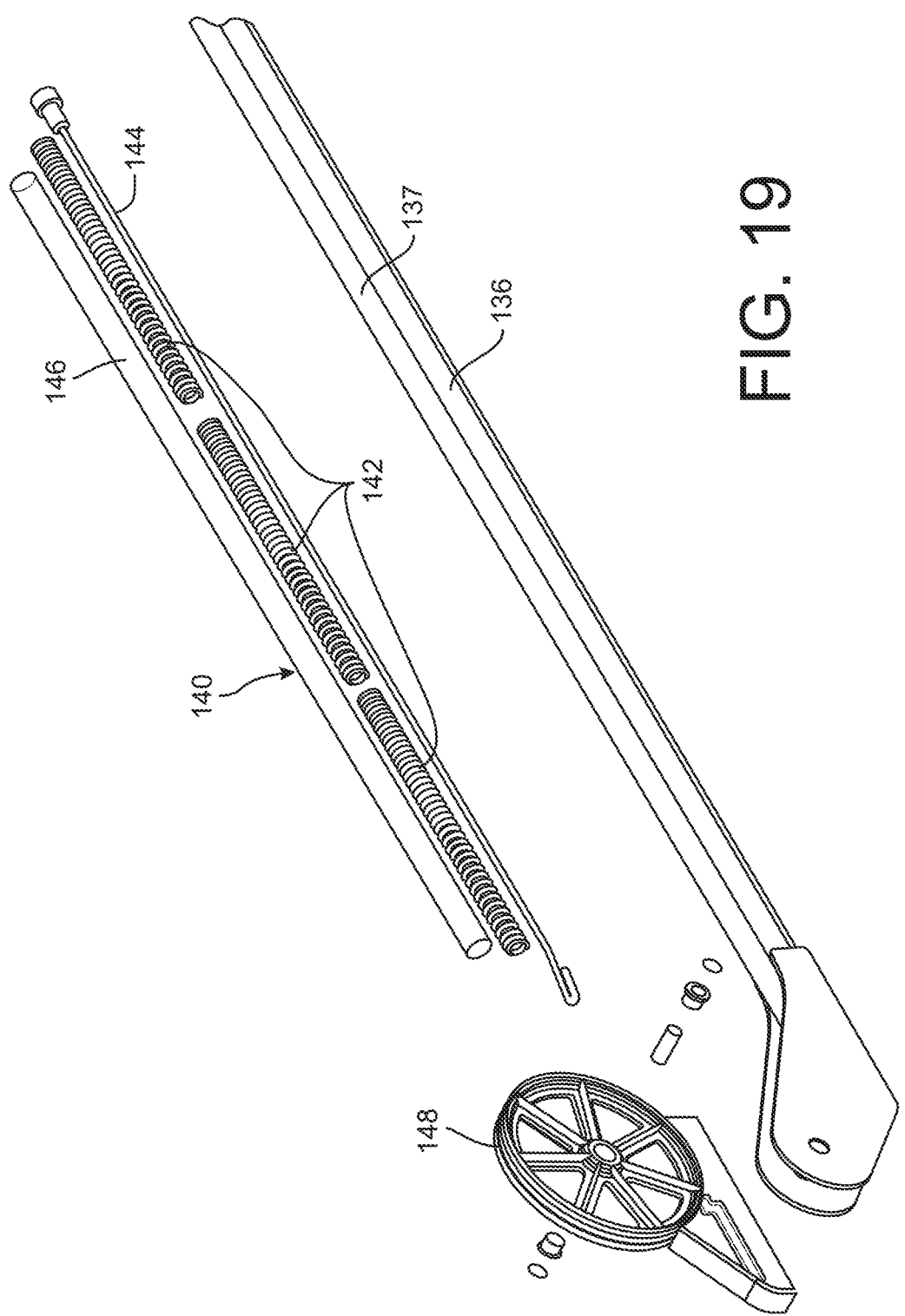
FIG. 19 is an exploded view of a bail arm of the arm assembly shown in FIG. 18.
Figure 20:
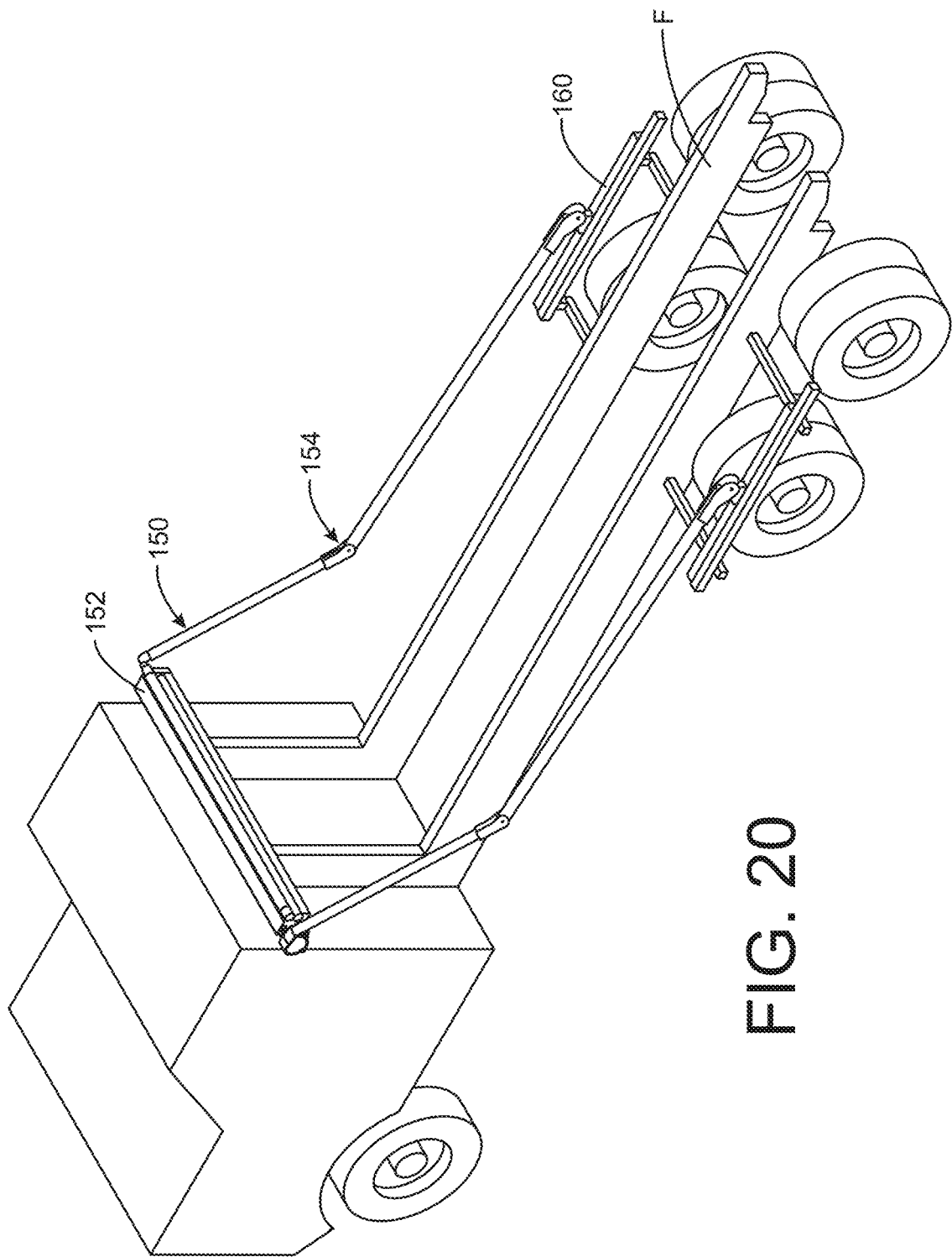
FIG. 20 is a perspective view of an arm assembly for a cover system according to yet another embodiment of the present disclosure.
Figures 21A, 21B, 21C:
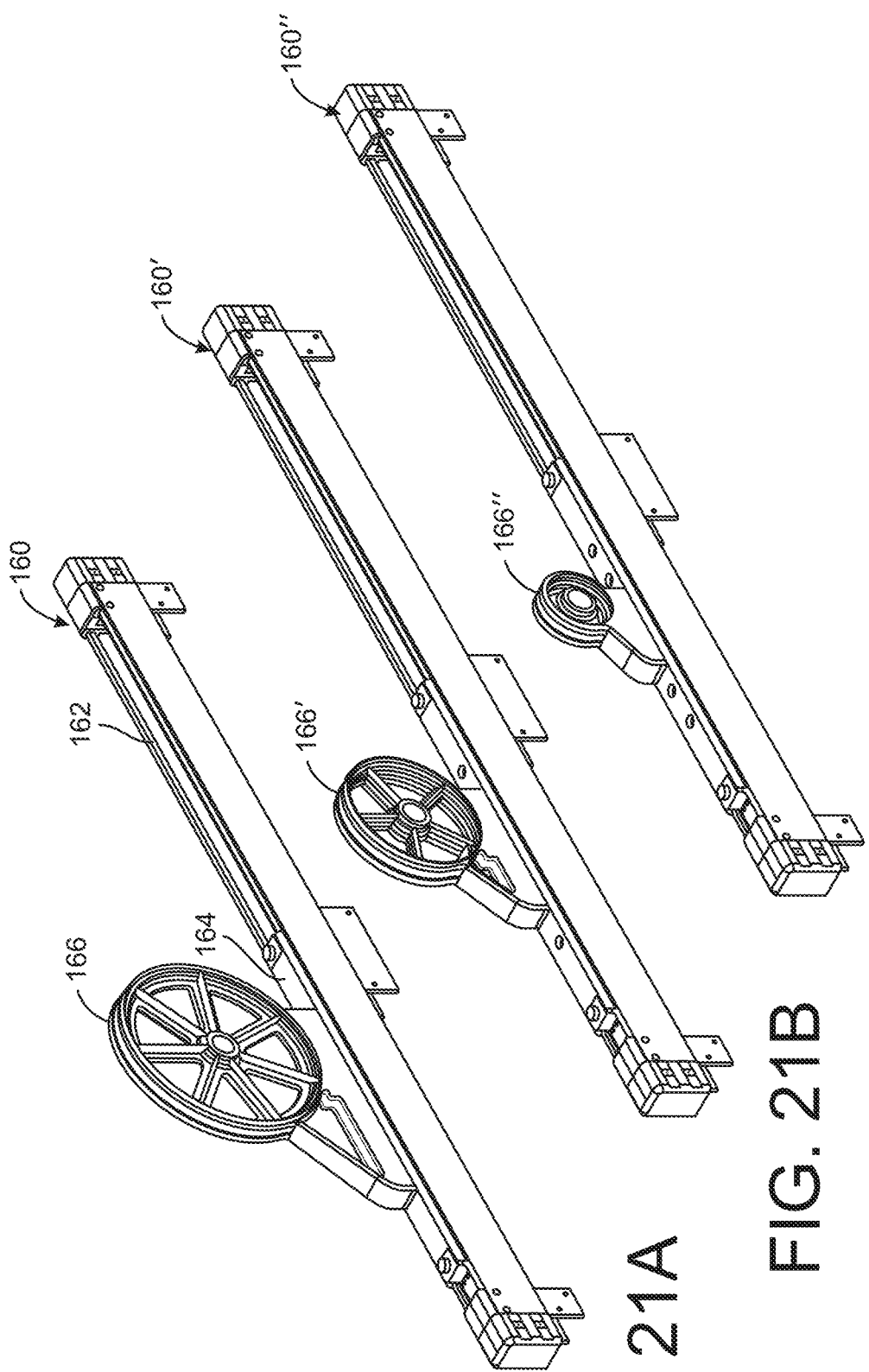
FIGS. 21A, 21b and 21c are perspective views of a sliding track incorporating a pulley according to the present disclosure for use with the arm assembly shown in FIG. 20.

The force mechanism can also be incorporated into the cover system 150 shown in FIG. 20, and in particular can be integrated into the bail arm assembly 154 in the same manner as shown in FIG. 19. However, in this embodiment the pulley 166 is mounted on a sliding mount 160 supported on the vehicle frame F, as shown in FIGS. 21A. The pulley 166 is carried by a sliding base 164 slidable mounted within a track 162 so that the location of the pivot point for the bail arm assembly 154 can be adjusted, as is known in the art. As shown in FIGS. 21B-C, pulleys 166' and 166" of different diameters may be carried by the sliding mount 160.

Figure 25:
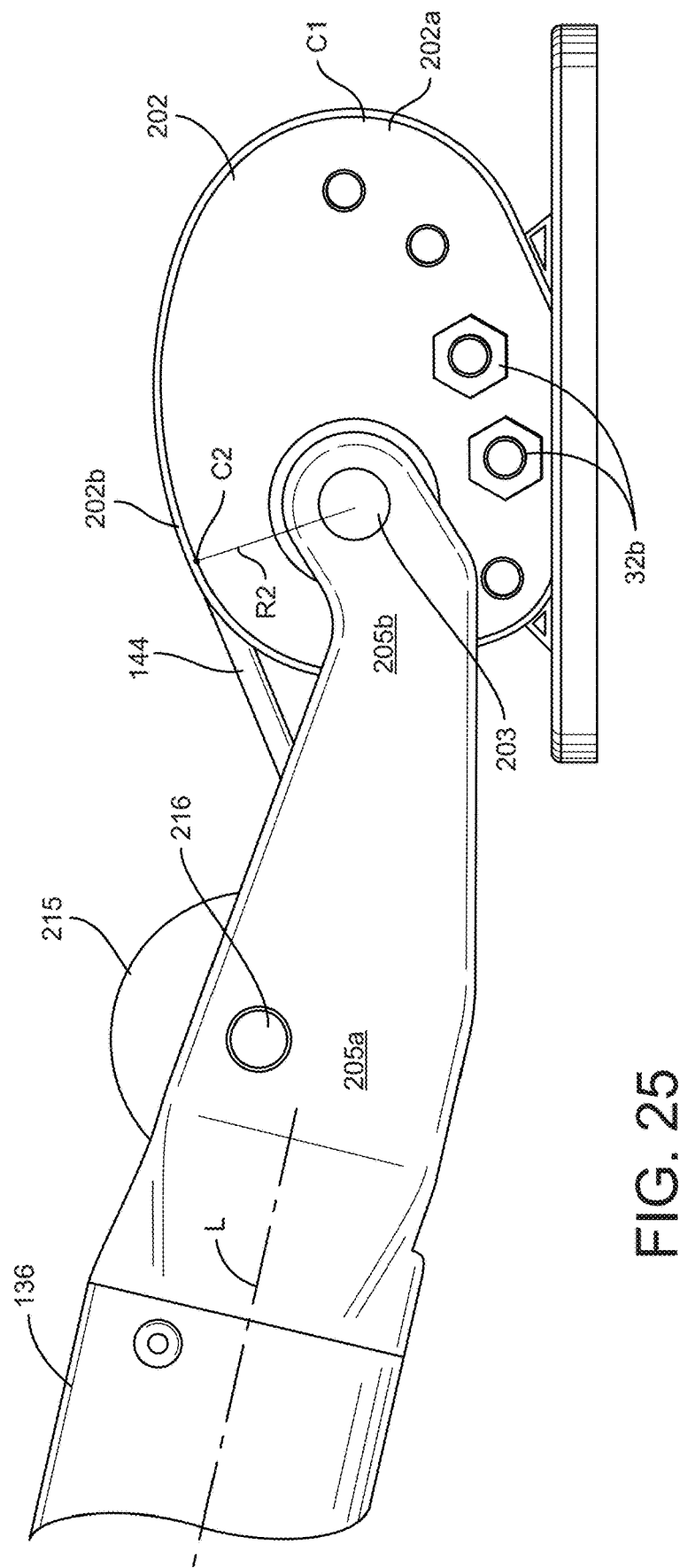
FIG. 25 is an enlarged side view of the force transmission mechanism shown in FIG. 22, depicted with the bail arm in its retracted position.
Figure 26:
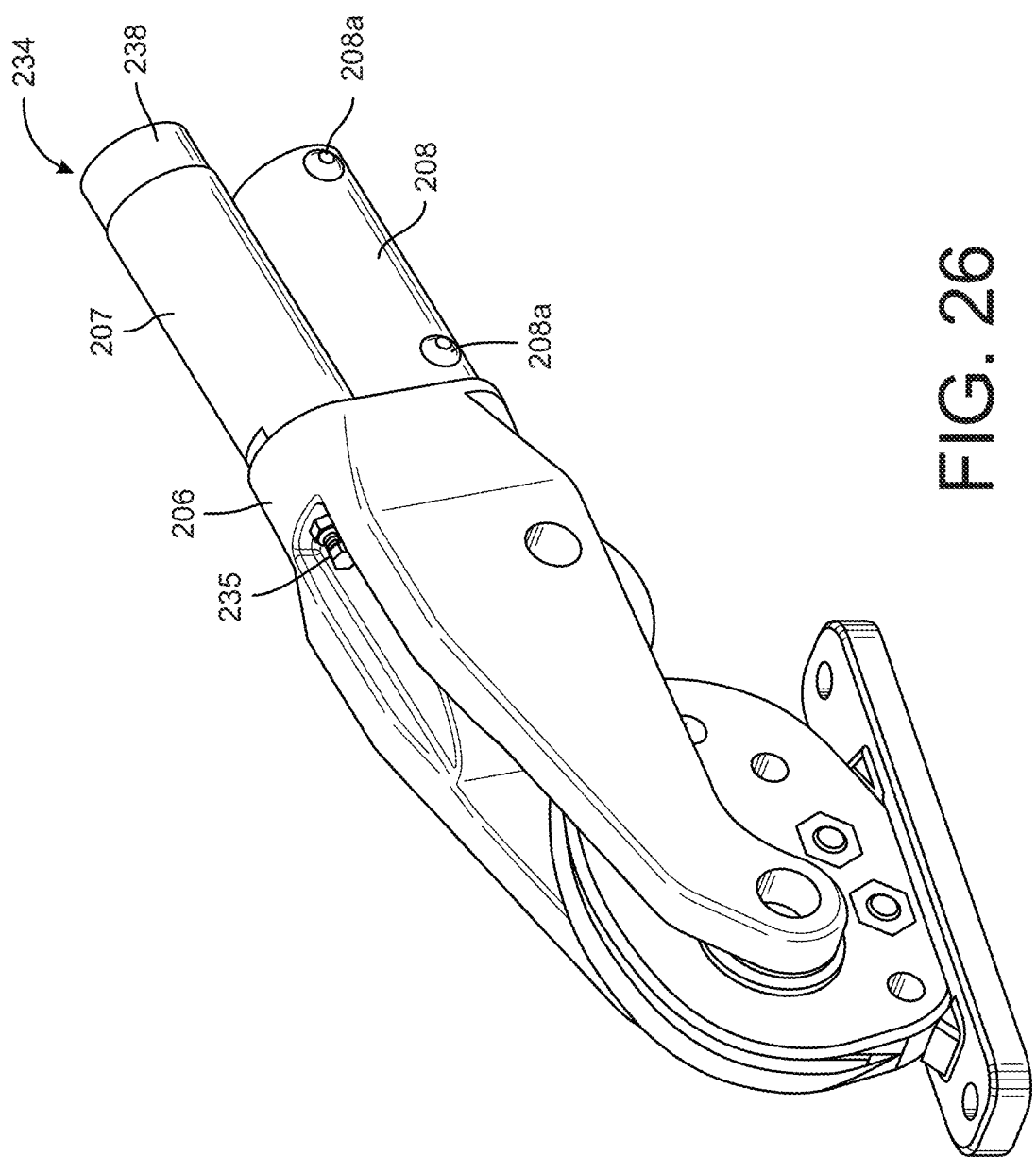
FIG. 26 is an enlarged view of the mounting hub of the force transmission mechanism shown in FIG. 22.

In another embodiment of the present disclosure, a modified force mechanism 200, shown in FIGS. 22-25, is provided for the bail arm assembly 134 shown in FIG. 18 or for the bail arm assembly 154 shown in FIG. 20. The force mechanism 200 can be used to pivot the lower arm 14 and/or upper arm 18 of the arm assembly 10, or can be used to pivot bail arms, such as arms 50 and 136, in the manner described above. In that respect, the arms 14/50/136 can include the torque mechanism 40 shown in FIG. 4 or mechanism 140 shown in FIG. 19 which includes the compression springs 42/142 disposed within the arm housing 50/137, with the cable 44/144 extending through the springs. However, rather than being anchored to the circular pulley 34/148/166, the modified force mechanism incorporates a non-circular or cam-shaped pulley 202, as best seen in FIG. 24-25. The cam-shaped pulley 202 includes a pivot pin 203 on which the legs 205 of a mounting hub 206 are mounted to pivot relative to the pulley 202, which is fixed to the vehicle. The mounting hub 206 is fastened to the arm 50, 136 so that the bail arms pivot with the legs 205 relative to the pulley. As shown in more detail in FIGS. 26-28, the mounting hub includes stems 207, 208, which similar to the mounting stems 64, 65 shown in FIG. 7. The stems are configured to be disposed in bores 54, 52 of the hollow arm 14/50/136 in the manner described above. The mounting screws 230 pass through holes 208a in the stem 208 to fasten the arm to the mounting hub. The compression springs 42/142 can be mounted within the bore 207a of the stem 207 using a spring base, such as base 48 discussed above, that is anchored to the stem 207.

Figure 27:
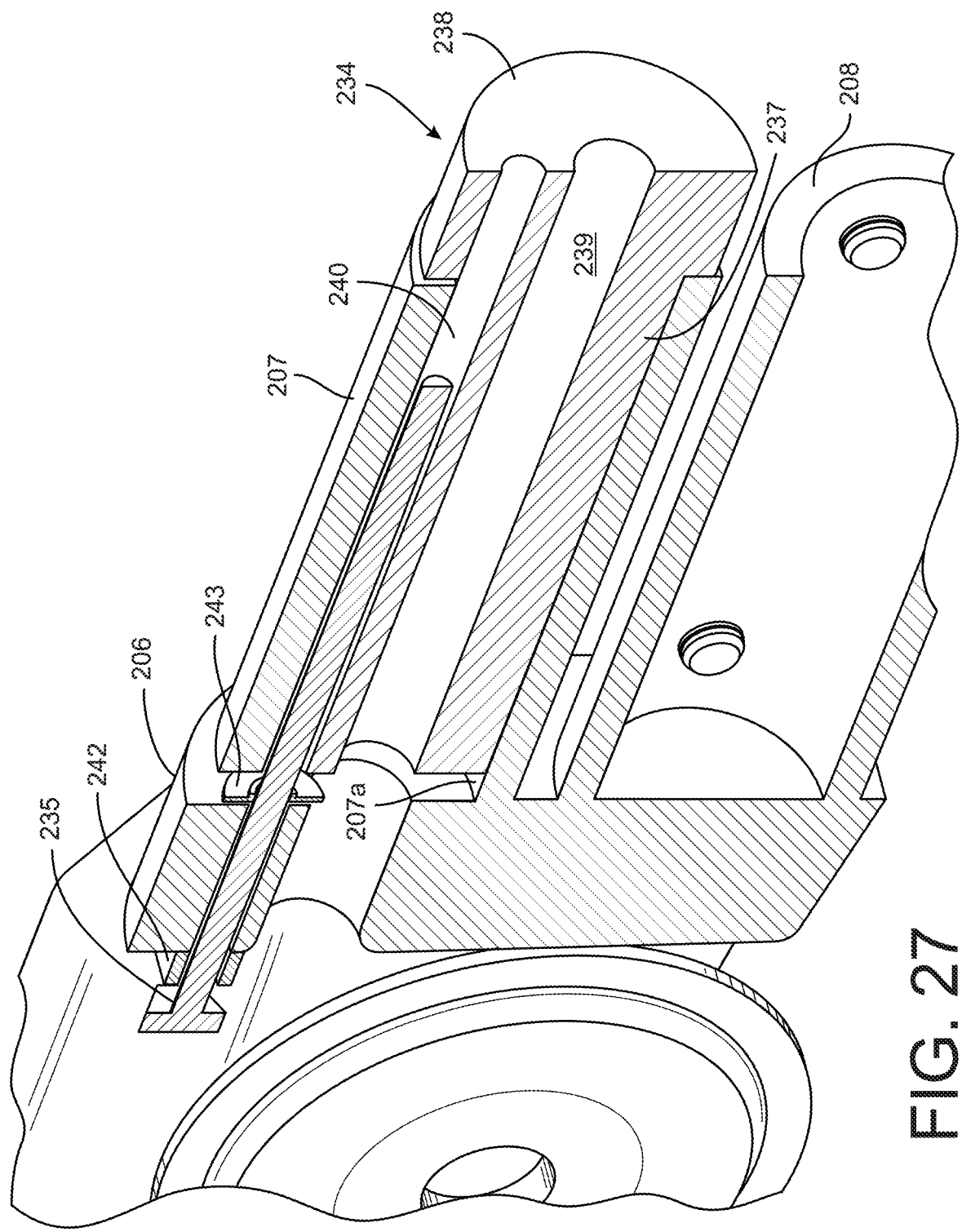
FIG. 27 is an enlarged cross-sectional view of the mounting hub shown in FIG. 26, particularly showing a tension adjustment mechanism according to the present disclosure, in which the mechanism is shown in its minimum tension position.
Figure 28:
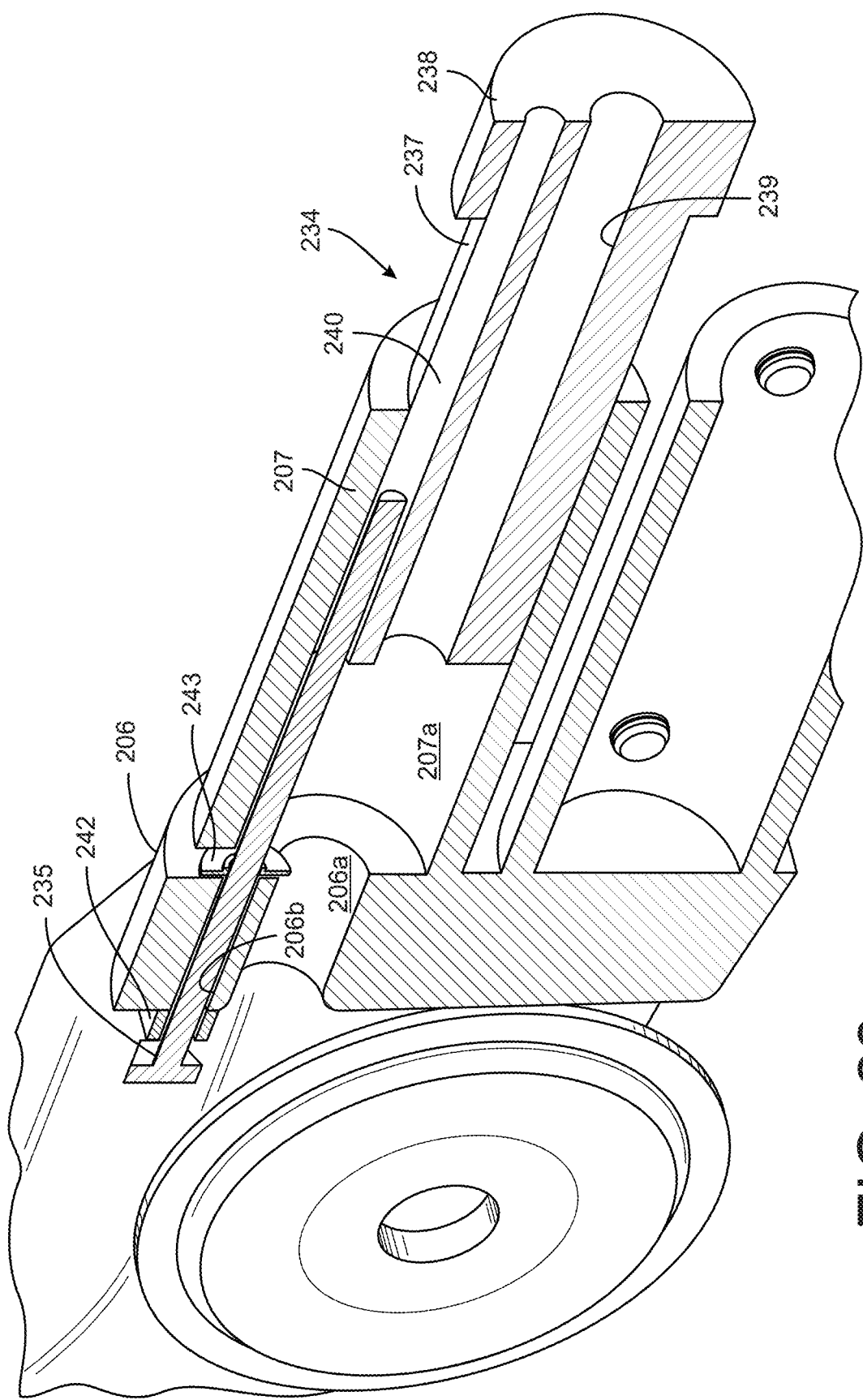

Alternatively, a spring tension mechanism 234 can be provided that can be adjusted with an externally accessible adjustment screw 235. In particular, as shown in FIGS. 27, 28, the mechanism 234 includes a spring base in the form of a piston 237 that includes a piston head 238 that serves as the base (such as base 48) for the compression springs 42/142. The spring within the arm 136 shown in FIG. 22, are arranged as shown in FIG. 8 and bear against the piston head 238, rather than the spring base 48. The cable 44/144 extends through a bore 206a in the mounting hub 206, through a cable bore 239 in the piston 237 and through the spring 42/142 to be held against the end of the spring(s) by a cap, such as end cap 46 (FIGS. 7-8). Whereas the spring base 48 of the prior embodiments is fixed to the arm housing, the piston 237 is movable within the bore of the arm housing. The adjustment screw 235 engages a threaded bore 240 in the piston that is offset from the cable bore 239. Rotation of the adjustment screw 235 moves the piston from the minimum tension position shown in FIGS. 26-27 in which the piston head 238 is in contact with the end of the stem 207, and the maximum tension position shown in FIG. 28 in which the piston head 238 is offset from the end of the stem. It is understood that moving the piston head away from the end of the stem 207 pushes or compresses the spring(s) 42/142 against the end cap 46, thereby placing the cable 44/144 in tension. Moving the piston head toward the end of the stem 207 relieves the compression of the spring(s), thereby reducing the tension in the cable. The adjustment screw 235 is held in position on the mounting hub 206 by a lock nut 242 and lock washer assembly 243 so that the screw can rotate freely relative to the bore 206a of the mounting hub.

Figure 36:
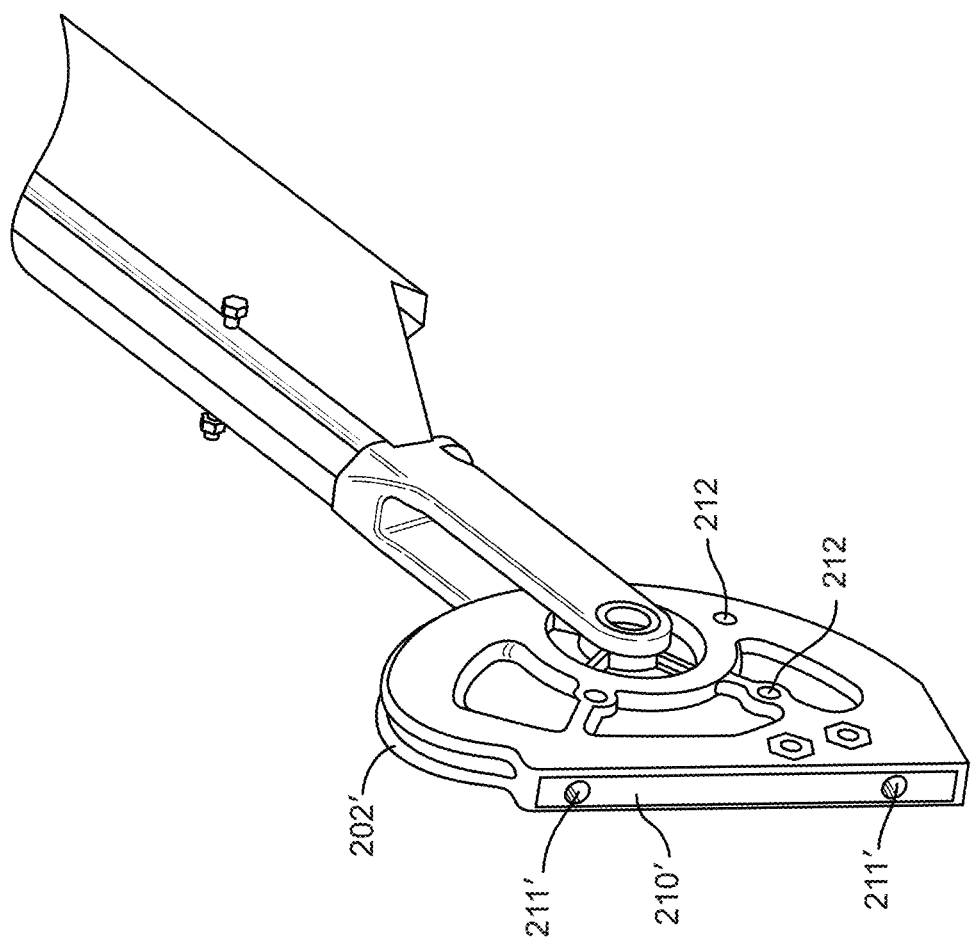
FIG. 36 is an enlarged view of a cam-shaped pulley according to a further embodiment of the disclosure.

The pulley 202 is supported on a base 210 that can be mounted to the vehicle with bolts extending through openings 211 in the manner shown in FIG. 18 or 20, including the siding mounts shown in FIGS. 21A-21C. A modified pulley 202' can include a modified base 210' having internal threaded bores 211', as shown in FIG. 36. The bores 211' receive screws extending from the vehicle into the bores. The pulley 202' is also configured to be mounted to a side wall of the vehicle, similar to that shown in FIG. 1. The pulley 202' thus includes bores 212 that extend laterally through the pulley to be received in complementary threaded bores in the side wall of the vehicle.

The bail arm 136 is shown in its two extreme positions in FIGS. 24-25—an extended position in which the cover carried by the bail arms is covering the vehicle (FIG. 24) and the retracted position in which the cover is stowed (FIG. 25). The cable 144 that is part of the torque mechanism described above, is anchored to the pulley 202 by a cable mount, such as the cable mount 32 at the bottom of the pulley 202, as described above, with screws 32b operable to close opposing clamping plates 32a onto the terminal end of the cable.

In the extended position, the cable is substantially unwound from the pulley and only contacts the pulley at the outer lobe 202a. When the cover and bail arms are retracted, the cable 144 winds around the pulley over the outer lobe 202a and the upper lobe 202b. It can be seen that the radial distance R1 from the contact or tangent point C1 between the cable and the outer lobe in the extended position of FIG. 24 is greater than the radial distance R2 of the contact or tangent point C2 at which the cable exits the pulley in the stowed position of FIG. 25. The radial distances R1, R2 represent different moment arms through the travel of the cable around the pulley, in contrast to the constant moment arm of the circular pulleys 34/148/166. In one specific embodiment, the radius R1 is nearly twice the radius R2. This configuration of the cam-shaped pulley reduces the amount of compression required for the springs 142 in the torque mechanism 140 from the compression required for the circular pulley to achieve the same torque and "opening force" to move the bail arms and cover from the deployed to the extended position. In one specific embodiment, the radius R1 is 5.25 inches and the radius R2 is 2.65 inches.

It can be understood that the dimension R1 represents the dimension along the major axis of the elongated or cam-shaped pulley 202, whereas the dimension R2 is measured along the minor axis of the pulley. However, in one embodiment, the pulley 202 is not purely elliptical, and the major and minor axes are not perpendicular to each other as in an ellipse. Instead, the pulley is configured so that the contact or tangent points C1, C2 of the cable 144 relative to the pulley 202 subtend an angle of about 110°. The outer contour 202c of the pulley is somewhat elliptical to provide a uniform change in torque as the cable 144 winds and unwinds on the pulley.

It can be appreciated that the angular rotation of the arm 14 or the bail arm 136 about the pivot pin 203 is about 110° for the cam-shaped pulley 202, whereas for the circular pulley the angular rotation is about 170° for the same range of movement between the extended and retracted positions. To achieve the deployment force sufficient to move the cover from stowed to extended, the five-inch diameter pulleys 34/148/166 compress the springs 42/142 by eight (8) inches. In contrast, the cam-shaped pulley 202 compresses the springs by about 5.5 inches to achieve the requisite deployment force. Moreover, the compressed force of the springs when the cover is in the stowed position shown in FIG. 25 is less than the compressed force of the springs with the circular pulley. The reduced force increases the life of the spring(s) in the torque mechanism 40/140. The tension adjustment mechanism 234 also contributes to the life of the spring(s) by allowing adjustment of the amount of pre-load on the springs and cable. This pre-load is the load on the spring(s) and cable when the arm is in its extended position shown in FIG. 24. A certain amount of load on the spring(s) and cable is desirable to hold the arm, and therefore the cover, in the extended position covering the container. In particular, the pre-load can prevent bouncing of the arm on the container due to road vibrations and shocks. The tension adjustment mechanism 234 allows for fine-tuning the pre-load of the spring(s) and cable to the minimum level necessary to hold the cover in place during use.

The force mechanism 200 in FIGS. 22-25 is configured to allow the bail arm to be extended to an angle of 12.5° in the deployed position shown in FIG. 24. The bail arm is retracted to an angle of 167.5° in the stowed position for a travel range of 155° that is sufficient for vehicle arrangements of the type shown in FIGS. 19 and 20 with appropriately sized bail arms 136. In order to achieve this angular sweep, the force mechanism 200, the legs 205 of the mounting hub 206 include a portion 205a that is colinear with the bail arm 136 and an angled portion 205b that engages the pivot pin 203. In one embodiment, the angled portion 205b of each leg is not colinear with the longitudinal axis and instead subtends an angle of about 120° with the longitudinal axis L of the bail arms. The pivot point of the bail arms, in the center of pivot pin 203, is thus offset from the longitudinal axis L, or put another way, the longitudinal axis L does not pass through the pivot point 203. That offset accommodates an intermediate pulley 215 that receives a portion 144a of the cable 144 between the bail arm 136 and the cam-shaped pulley 202. The portion 144a extends over the top of the intermediate pulley 215 when the bail arm is in its extended position shown in FIGS. 22, 24, and underneath the intermediate pulley when the bail arm is in its retracted position shown in FIG. 25. The intermediate pulley thus increases the path of the cable 44/144 between the torque mechanism inside the bail arm 136 and its anchor point 220 at the base of the cam-shaped pulley 202. The contact between the cable and the intermediate pulley in the extended position is about 80-90° and in the stowed position is about 35-45°. In one embodiment, the intermediate pulley 215 is a circular pulley with a radius of two (2) inches. The axis of rotation 216 of the intermediate pulley is offset from the longitudinal axis L of the bail arm and preferably located so that the portion 144a of the cable 44/144 extends parallel to the axis and colinear with the cable within the torque mechanism 40/140 inside the bail arm.

Figure 29:
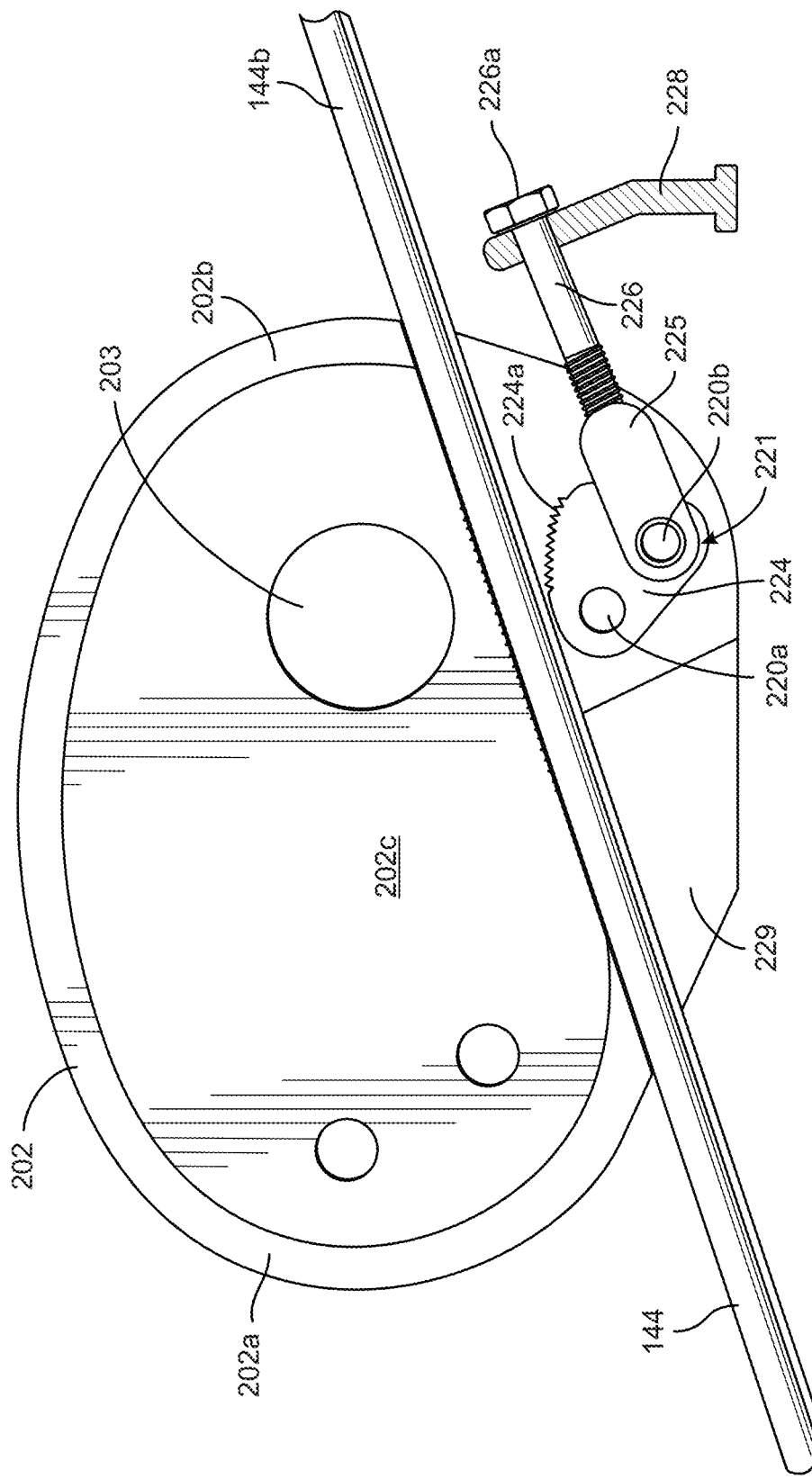
FIG. 29 is an enlarged side cut-away view of the cable locking mechanism according to one embodiment, depicted with the mechanism in its unlocked position.
Figure 30:
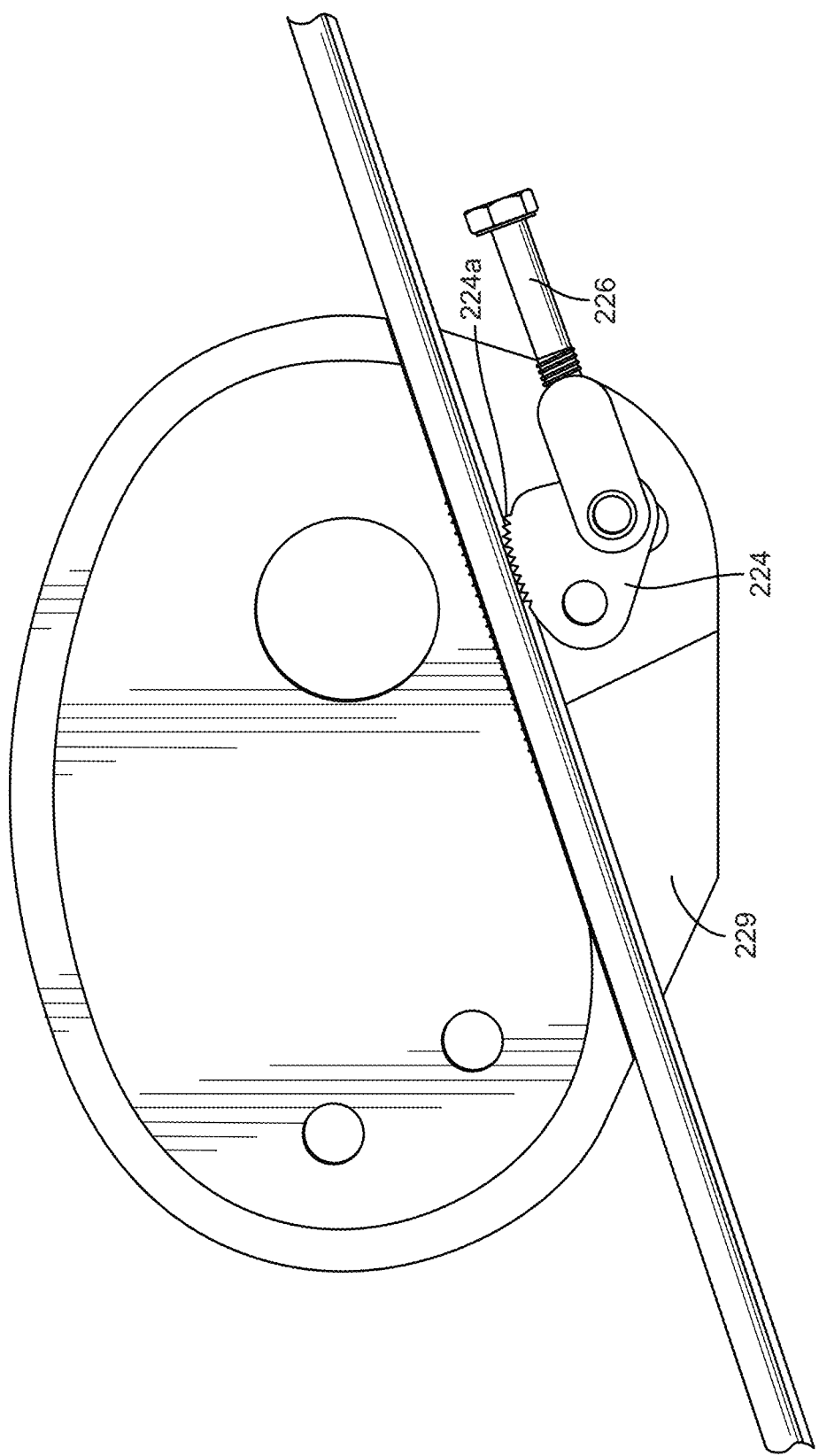
FIG. 30 is an enlarged side cut-away view of the cable locking mechanism shown in FIG. 29, depicted with the mechanism in its locked position.
Figure 31:
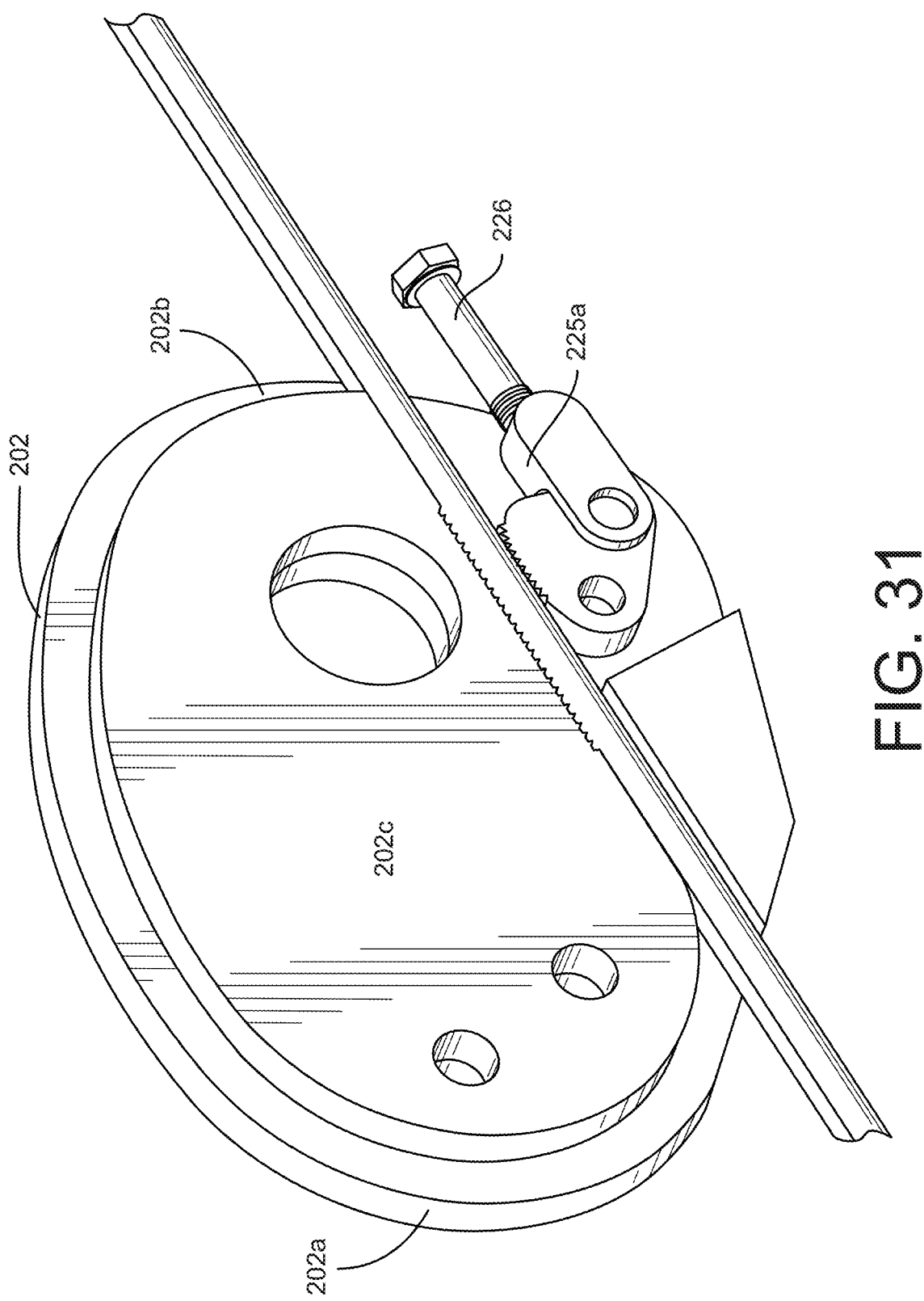
FIG. 31 is an enlarged perspective view of the cable locking mechanism shown in FIG. 30.
Figure 35:
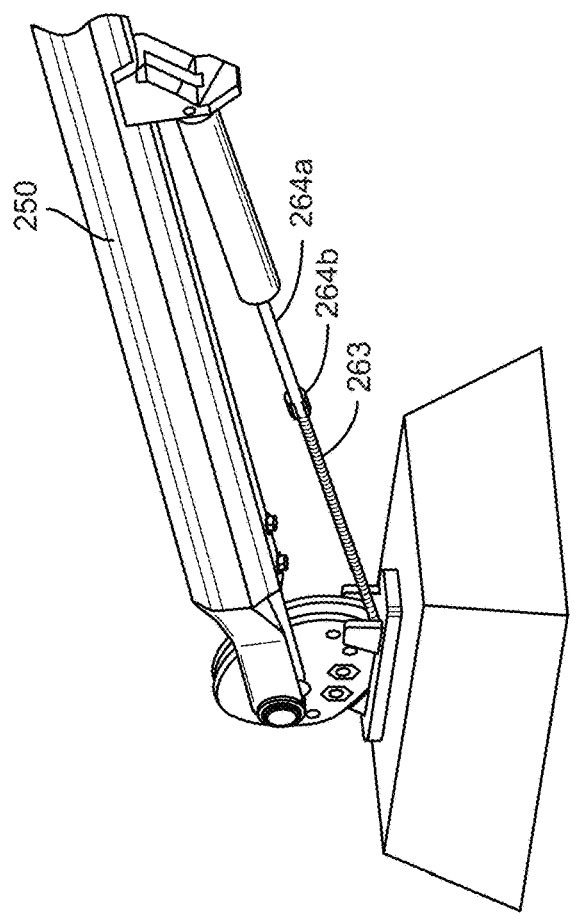
FIG. 35 is a side perspective view of the torque mechanism shown in FIGS. 32-33, depicted with the housing removed and the bail arm in extended position.
Figure 34:
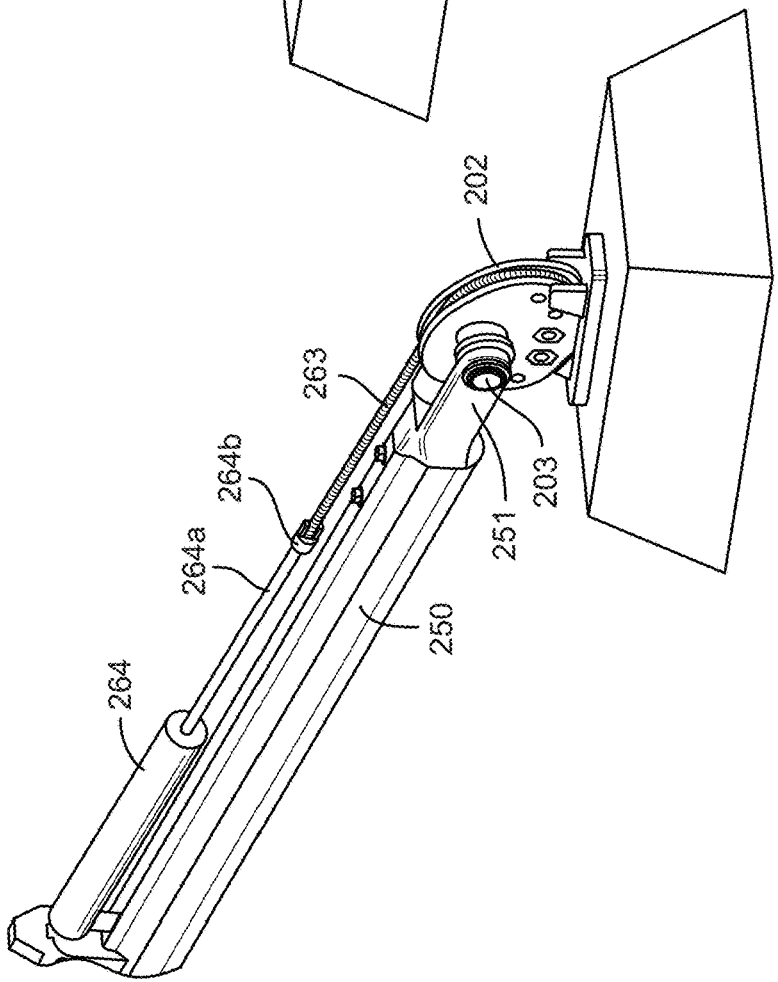
FIG. 34 is a side perspective view of the torque mechanism shown in FIGS. 32-33, depicted with the housing removed and the bail arm in retracted position.

The terminal end of the cable 144 is clamped to the pulley 202 or base 210 of the force mechanisms 200. In lieu of the cable mount 32 described above, the pulley 202 can include a ratchet clamp mechanism 221 that can be manually loosened or tightened to release or clamp the terminal end 144b of the cable, as shown in FIGS. 29-31. The mechanism 221 includes a ratchet plate 224 that is pivotably mounted to the pulley at the mount 220a. The plate 224 includes teeth 224a configured to frictionally and mechanically engage the cable portion 144b. A pivot link 225 is pivotably connected to the ratchet plate 224 at a mount 220b so that linear movement of the pivot link 225 away from the ratchet plate will cause the plate to pivot. The ratchet plate pivots from the position shown in FIG. 29 in which cable portion 144b is free, and the position shown in FIGS. 30, 31 in which the teeth 224a of the ratchet plate bear against or "dig into" the cable portion and press the cable terminal portion 144b against the core 202c of the pulley 202. The pivot link 225 is translated by a bolt 226 threaded into a mounting bore 225a in the link. The head 226a bears against a support flange 228 mounted to the base 210 as the bolt is rotated, drawing the pivot link toward the flange to thereby pivot the ratchet plate. Rotating the bolt in the opposite direction pushes the pivot link away from the flange and toward the ratchet plate to pivot the plate and teeth 224a out of engagement with the cable. The pulley 202 can include a guide ramp 229 offset from the pulley core 202c to provide a limited channel to align the terminal portion 144b of the cable with the ratchet plate 224.

In one feature of the force mechanism 200, the components of the mechanism can be easily disassembled to replace the torque mechanism 40/140, and particularly the springs 142 inside the bail arm 136. The mounting hub 206 is configured to be fitted within the open end of the hollow bail arm 136 in a manner similar to the engagement of the mounting stems of the pivot pulley 60 shown in FIGS. 7-8. Mounting bolts 230 fasten the bail arm to the mounting hub. In order to remove the bail arm from the mounting hub 206, the cable tensioning screw 235 is loosened to relieve some of the spring force of the pre-tensioned springs 42/142. The cable clamp can be released by loosening the screws 32b for the clamping mechanism of FIG. 7 or by loosening the bolt 226 for the clamping mechanism of FIG. 29. With the cable loose, the springs 42/142 are unloaded, and at that point the mounting bolts 230 can be removed, allowing the bail arm 136 to be pulled off the mounting hub 206.

In another embodiment, the torque mechanism is accessible through a housing mounted on the bail arm, as shown in FIGS. 32-35. The bail arm 250 can be a single tubular structure, as opposed to the dual channel embodiments shown herein. The bail arm 250 includes pivot legs 251 pivotably mounted to the cam-shaped pulley 202 at the pivot mount 203. The legs 251 can be generally aligned along the longitudinal axis of the bail arm 250. The legs 251 can be part of an integral body that is disposed inside the end of the hollow bail arm, similar to the mounting stems 64, 65 shown in FIG. 7. The torque mechanism 260 is mounted to the outer surface of the bail arm 250. In particular, the torque mechanism 260 includes a cable 263 that is fastened to the pulley 202 in the manner described above. The cable 263 is connected to a biasing mechanism 264, which may incorporate the springs 142, described above, or may constitute a gas-filled spring. The biasing mechanism 264 is supported by a mounting bracket 265 that is fastened to the outside of the bail arm 250 in a conventional manner. In one embodiment, the cable 263 extends through the springs in the manner shown in FIG. 19. In another embodiment, the cable 263 is engaged by a cable mount 264b to a rod 264a extending from the biasing mechanism 264. In one embodiment, the rod 264a is the output rod fastened to the piston of the gas spring.

The torque mechanism 260 includes a cover 268 and end plate 269 that house the biasing mechanism 264. The end plate 269 can be separately removable from the housing 268 to provide access to the mounting bracket 265. The mounting bracket can support an adjustment screw that attaches the biasing mechanism to the bracket, which adjustment screw can be accessed when the end plate is removed. The housing 268 is fastened to the bail arm with conventional fasteners. It can be appreciated that the entire torque mechanism can be readily accessed by removing the housing 268, thereby facilitating repair or replacement of the components of the mechanism 260.

Figure 37:
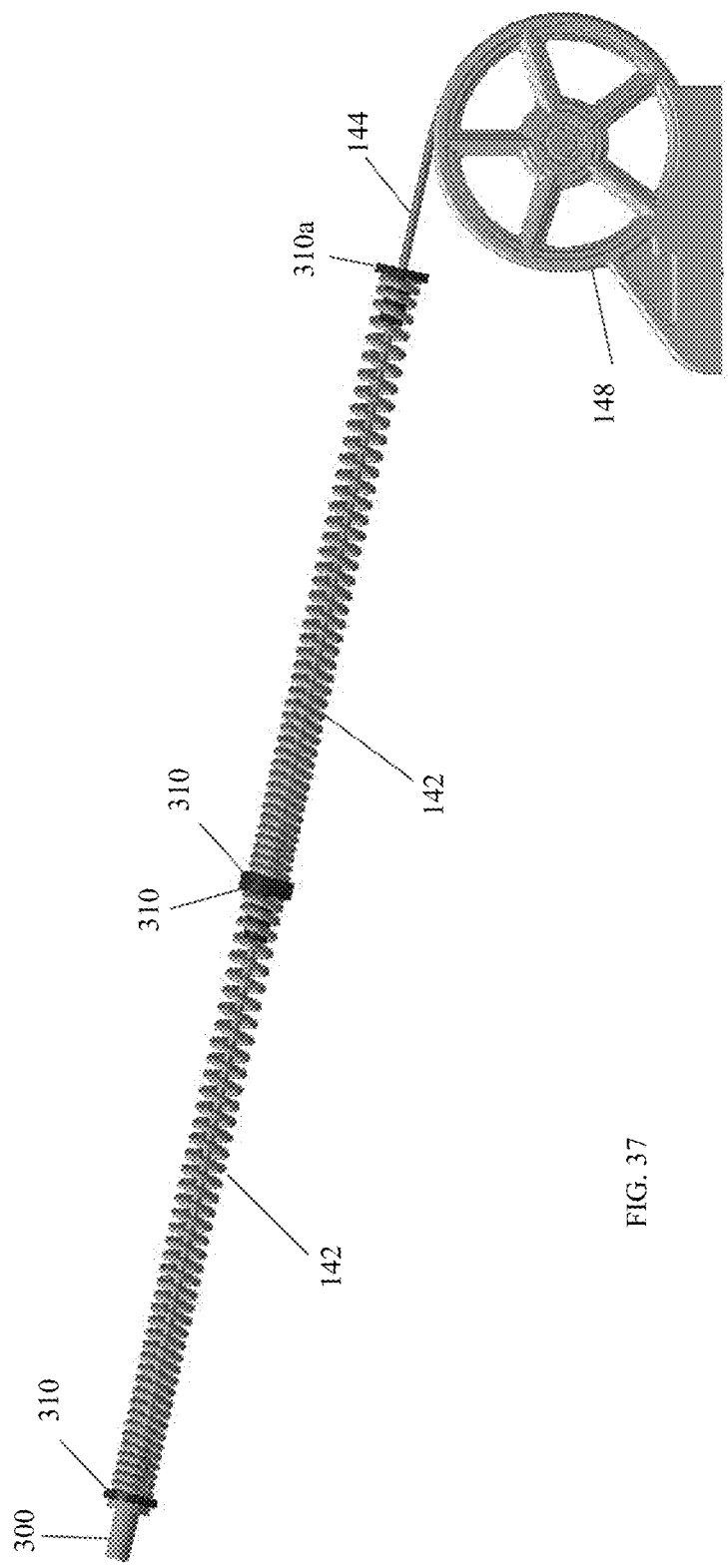
FIG. 37 is a cut-away view of the bail arm shown in FIG. 19 with a low friction spring guide engaged to the springs according to one aspect of the present disclosure.
Figure 38:
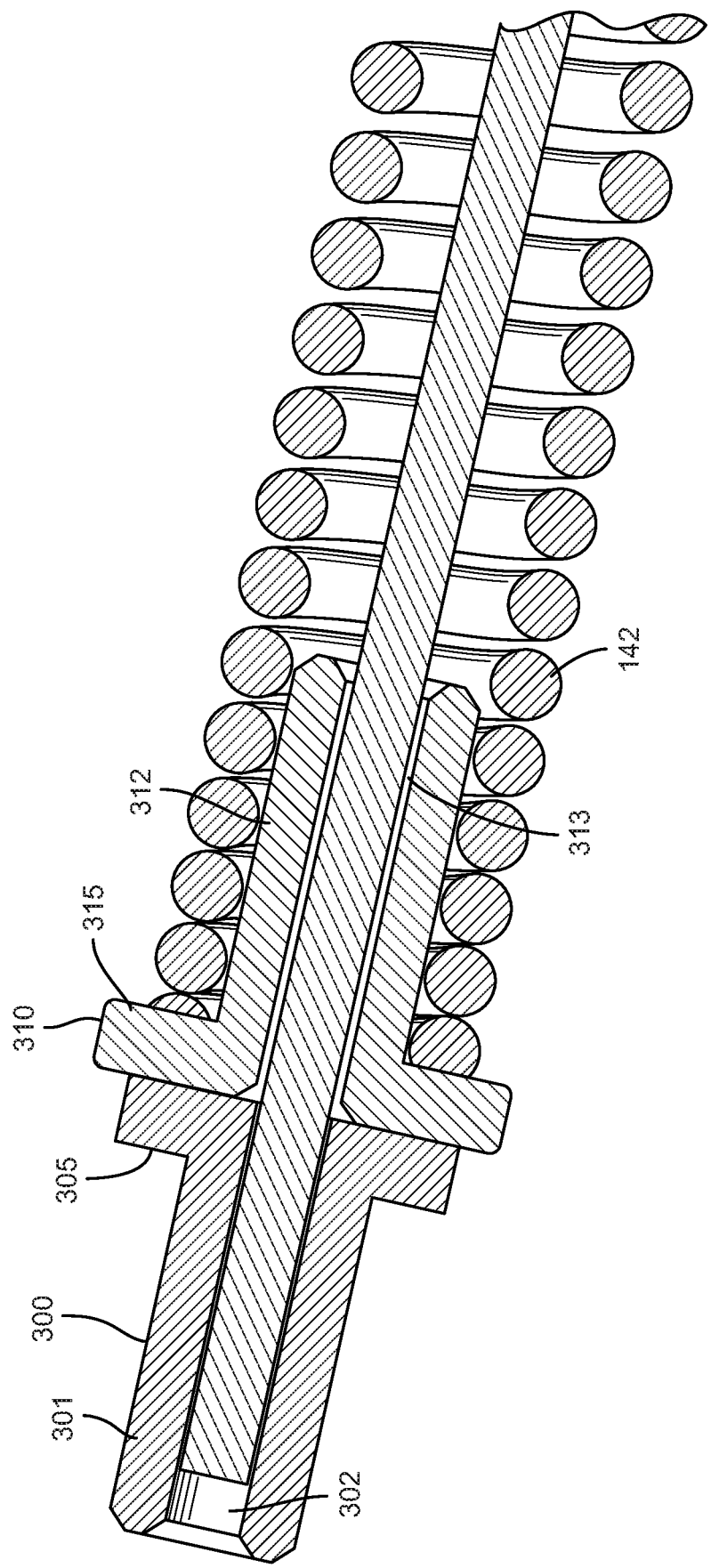
FIG. 38 is an enlarged view of the spring guide shown in FIG. 37.

In another aspect, a spring guide can be provided to engage the springs, such as springs 142 within the pivoting arms. As shown in FIGS. 37-38, the bail arm housing is removed to show the two springs 142 with the cable 144 extending through the springs. One end of the cable is mounted to the pulley 148 and the opposite end has a cap 300 attached to the cable to hold the springs within the pivoting arm housing. As shown in more detail in FIG. 38, the cap 300 includes a collar 301 that defines a bore 302 for receiving the end of the cable 144. The attachment between cap and cable can be press-fit, crimping, welding or any other suitable method for fixing the cap to the cable. The cap further includes a circumferential flange 305 that beats against the spring guide 310. It is through this interface that the springs 142 are compressed as the cable 144 is wound around the pulley 148.

The assembly includes spring guides 310 at the ends of each of the springs 142. As shown in FIG. 37, the adjacent springs each include a spring guide 310 at the respective facing ends of the springs. So rather than the springs contacting each other directly, the only direct contact is between the spring guides 310. As shown in FIG. 38, the spring guide 310 is similar in configuration to the cap 300, including a collar 312 that defines a bore 313 therethrough. The bore 313 is sized to permit free passage of the cable 144 therethrough. The spring guide 310 further includes a circumferential flange 315 that bears against the end of the spring 142. The flange is sized for a close running fit within the bore of the pivoting arm housing 136 to guide the spring within the housing bore as it is compressed and relaxed. The flanges 315 of the two adjacent spring guides contact each other when the springs and cable are assembled. The flange of the end-most spring guide 310a contacts the pivoting arm housing so that the spring can be compressed between the cap 300 and the end-most spring guide. The spring guide, or at least the circumferential flange 315, is formed of a low friction material so that the spring guide will not catch on the bore of the housing as the spring is depressed or relaxed. In one specific embodiment, the entire spring guide 310 is of one-piece construction and formed of a plastic or resin material.

Figure 39:
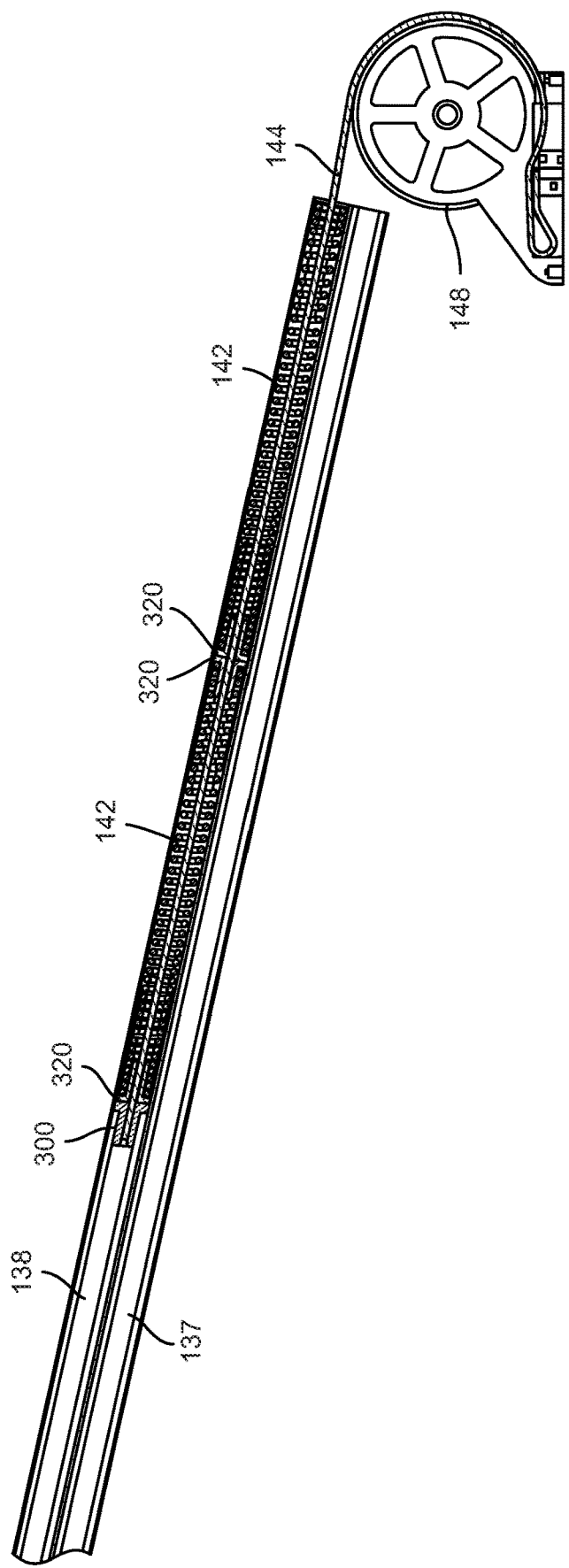
FIG. 39 is a cut-away view of the bail arm shown in FIG. 19 with a spring guide engaged to the springs according to a further aspect of the present disclosure.
Figure 40:
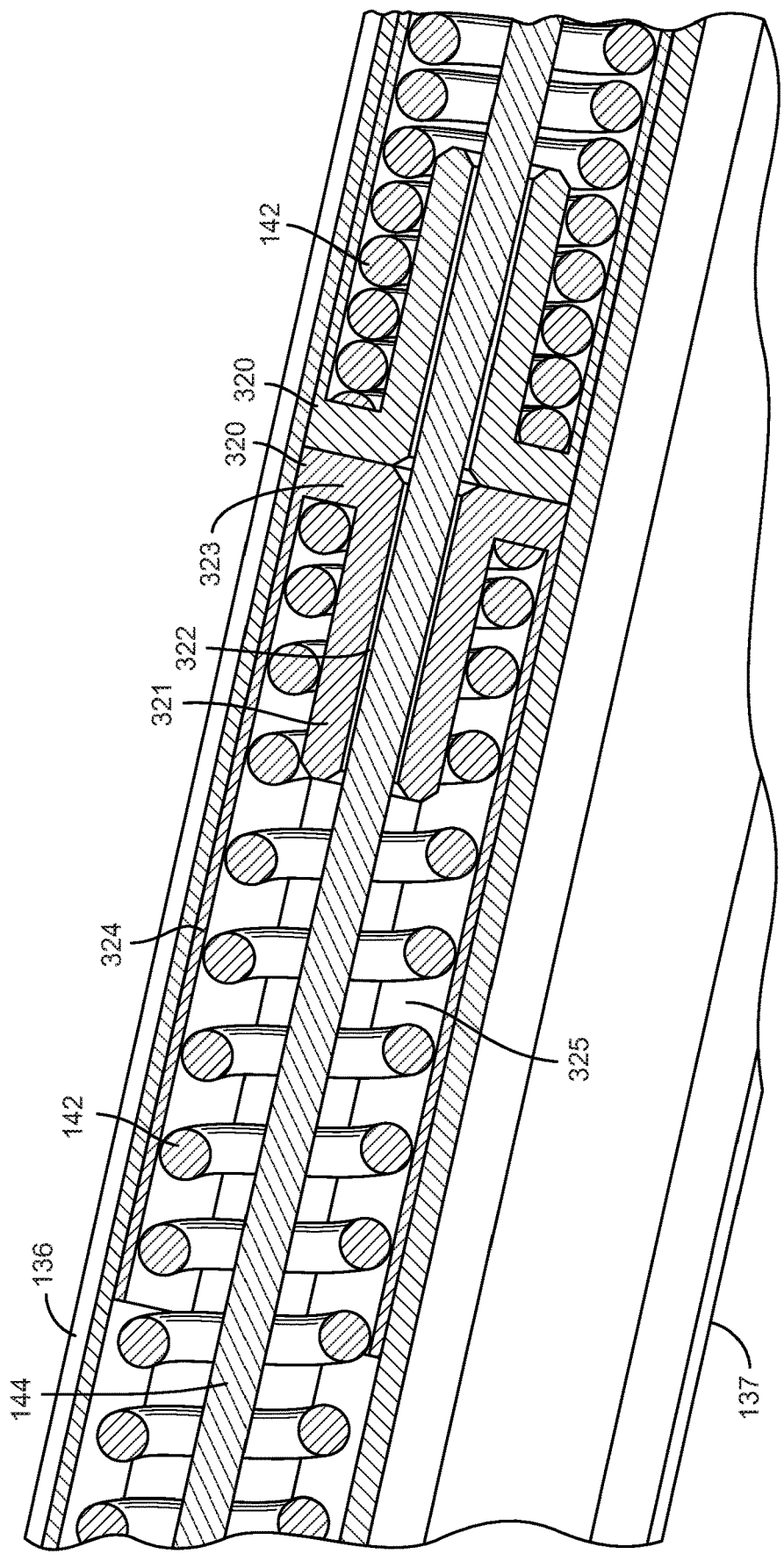
FIG. 40 is an enlarged view of the spring guide shown in FIG. 39.
Figure 41:
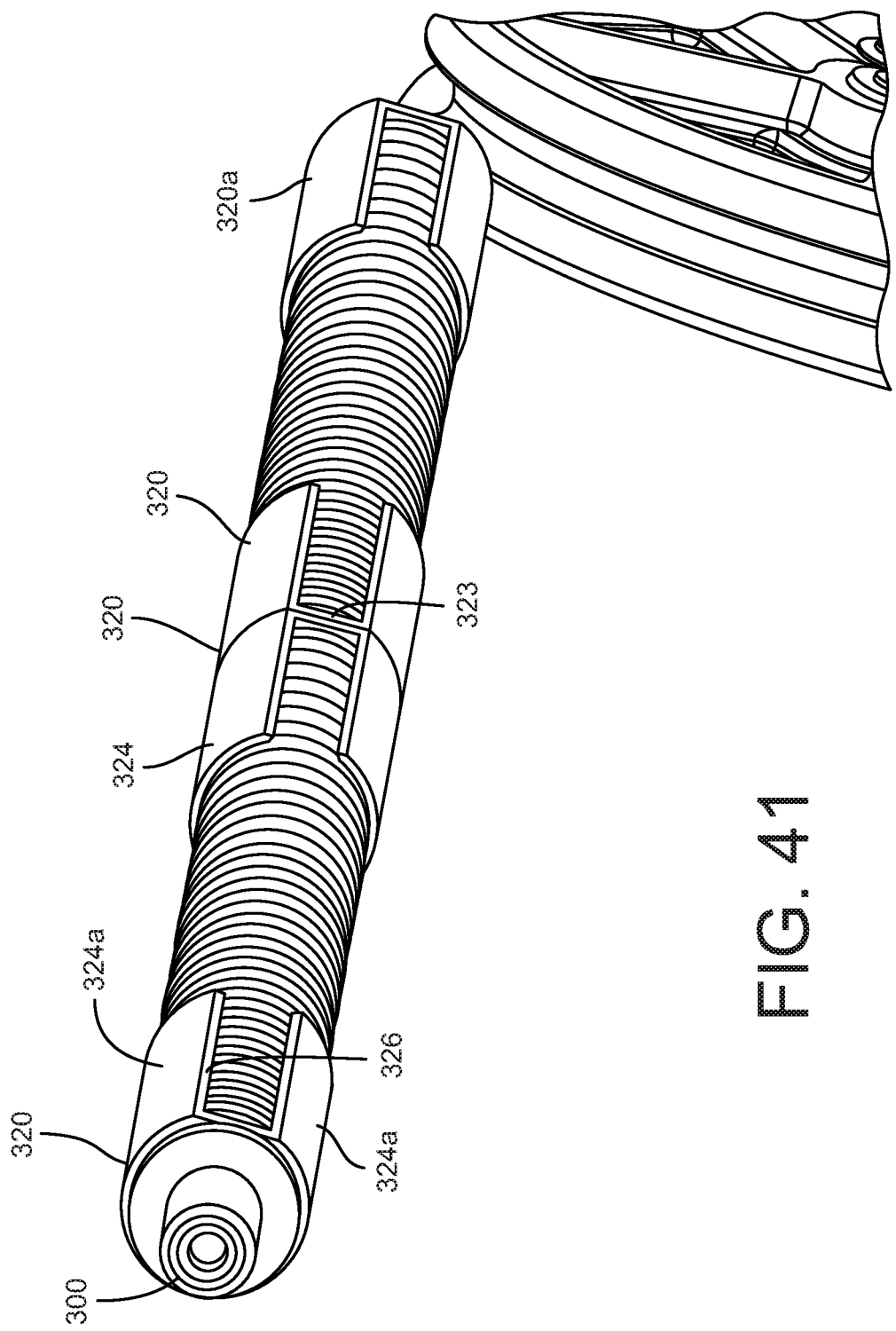
FIG. 41 is an end perspective view of the spring guide shown in FIG. 39.

Another embodiment of a spring guide is shown in FIGS. 39-41. As with the spring guide 310, the spring guide 320 is disposed at each end of each of the springs 142. As shown in the detail view of FIG. 40, the spring guide 320 includes a collar 321 that defines a bore 322 for freely receiving the cable 144. The guide also includes an annular flange 323 that is sized for a close running fit with the bore of the pivoting arm housing. However, unlike the spring guide 310, the spring guide 320 includes a sleeve 324 that extends from the flange to envelop an end portion of the spring 142 within a space 325 defined by the sleeve. As shown in FIG. 41, the sleeve 324 is formed by two or more arms 324a separated by a gap 326. In the preferred embodiment, two arms 324a are provided that span at least 90° around the circumference of the spring 142, with the gap 325 between arms spanning no more than 90° around the circumference. The sleeve 324 is in close running contact with the bore of the pivoting arm housing. The sleeve also contains the spring within the space 325. As with the spring guide 310, the flanges of the adjacent spring guides 320 contact each other, and the flange of the end-most spring guide 310a contacts the pivoting arm housing so that the spring can be compressed between the cap 300 and the end-most spring guide 320a. One benefit of both spring guides 310, 320 is that the guides keep the springs square within the pivot arm housing so that the force compressing the spring is aligned with the longitudinal axis of the spring. This feature prevents the middle of the springs from buckling or deflecting laterally as the spring is compressed, which can significantly reduce the compression life of the spring.

The force transmission mechanisms disclosed herein are configured to store energy in one direction of movement of the arm or bail arm, and to release energy to move the arm or bail arm in the opposite direction of movement. Thus, in the illustrated embodiments, the force transmission mechanisms store energy when the cover is retracted by the motor toward the stowed position, and release energy to move the cover in the opposite direction toward its deployed position. In the illustrated embodiments, the energy is stored upon compression of the force transmission mechanism, whether coil springs, resilient bushings or gas springs as described above. Alternatively, the force transmission mechanism can be configured to store energy upon extension or expansion, such as by stretching the coil spring(s), with the energy generated by retraction of the mechanism.

The present disclosure should be considered as illustrative and not restrictive in character. It is understood that only certain embodiments have been presented and that all changes, modifications and further applications that come within the spirit of the disclosure are desired to be protected.

What is claimed is:

1. An arm assembly for a cover system to cover the open top of a container, comprising:
    a non-circular pulley including an outer curved surface, said pulley defining a pivot point and having a major dimension from the pivot point to a first tangent point on said outer surface and a minor dimension from the pivot point to a second tangent point on the outer surface, the major dimension being greater than the minor dimension, said pulley further including a mounting component for mounting said pulley on said container;
    an elongated arm having one end connected to the cover and an opposite end pivotably mounted to said pulley at said pivot point; and
    a force mechanism mounted to said elongated arm, said force mechanism connected to said non-circular pulley by a cable, said cable contacting said pulley at said first tangent point when said elongated arm is in a first position and said cable wrapped on said pulley to contact said second tangent point when said elongated arm is in a second position, said force mechanism configured to store energy when said elongated arm moves from said first position to said second position and to release energy to move said elongated arm from said second position to said first position.

2. The arm assembly of claim 1, wherein said force mechanism includes:
    a resiliently compressible element having one end carried by said elongated arm and an opposite end connected to one end of said cable, wherein an opposite end of said cable is anchored to said pulley, whereby as said cable is wrapped around said pulley from said first tangent point to said second tangent point, said cable compresses said resiliently compressible element.

3. The arm assembly of claim 2, wherein said resiliently compressible element includes one or more compression springs.

4. The arm assembly of claim 2, wherein said resiliently compressible element includes a gas spring.

5. The arm assembly of claim 1, wherein said mounting component is a base integral with said pulley, said base including fastener openings configured to receive fasteners for fastening said base to the container.

6. The arm assembly of claim 1, wherein said mounting component includes a plurality of fastener openings extending transversely through said pulley and arranged to receive fasteners for fastening said pulley to a side wall of the container.

7. The arm assembly of claim 1, wherein said pulley includes a cable mount configured to adjustably clamp said cable to said pulley.

8. The arm assembly of claim 7, wherein said cable mount includes a ratchet plate pivotably mounted to said pulley and including teeth configured to frictionally and mechanically engage said cable to clamp said cable to said pulley.

9. The arm assembly of claim 8, wherein said cable mount further includes a pivot link pivotably connected to the ratchet plate and configured so that linear movement of the pivot link causes the ratchet plate to pivot relative to said cable.

10. The arm assembly of claim 1, wherein said major dimension is approximately twice the minor dimension.

11. The arm assembly of claim 10, wherein said major dimension is 5.25 inches and said minor dimension is 2.65 inches.

12. The arm assembly of claim 1, wherein said major dimension and said minor dimension subtend an angle of 110°.

13. The arm assembly of claim 1, wherein said elongated arm defines a longitudinal axis and includes a pair of legs disposed on opposite sides of said pulley, each of said legs including an angled portion pivotably mounted to said pulley at said pivot point, said angled portion arranged at a non-colinear angle relative to said longitudinal axis, so that said longitudinal axis does not intersect said pivot point of said pulley.

14. The arm assembly of claim 2, wherein said elongated arm defines a longitudinal axis and includes a pair of legs disposed on opposite sides of said pulley, each of said legs including an angled portion pivotably mounted to said pulley at said pivot point, said angled portion arranged at a non-colinear angle relative to said longitudinal axis, so that said longitudinal axis does not intersect said pivot point of said pulley.

15. The arm assembly of claim 14, further comprising an intermediate pulley mounted between said legs and arranged between said non-circular pulley and said resiliently compressible element, with said cable wound around a portion of said intermediate pulley.

16. The arm assembly of claim 15, wherein said intermediate pulley is a circular pulley and the axis of rotation of the intermediate pulley is offset from said longitudinal axis.

17. The arm assembly of claim 16, wherein said intermediate pulley has a radius of 2 inches.

18. The arm assembly of claim 1, wherein said arm is a hollow tube and at least a portion of said force mechanism is disposed within said hollow tube.

19. The arm assembly of claim 1, wherein said arm has an outer surface and said force mechanism is mounted to said outer surface.

20. The arm assembly of claim 19 wherein said force mechanism includes a housing removably mounted to said arm to cover at least a portion of said force mechanism.

21. An arm assembly for a cover system to cover the open top of a container, comprising:
a pulley supported on the container, the pulley defining an outer curved surface;
a mounting hub pivotably mounted on said pulley to pivot relative to said pulley;
an elongated housing having one end engaged to said mounting hub to pivot with said mounting hub relative to said pulley, said housing defining an elongated bore extending from said one end at least part way through said housing;
a resiliently compressible element disposed within the elongated bore, the compressible element having an inboard end positioned at one end of said bore adjacent said mounting hub, and an opposite outboard end;
a spring base movably mounted to said mounting hub and defining a head to support said compressible element at said inboard end thereof; and
a cable extending through said mounting hub and compressible element, one end of said cable engaged to said outboard end of said compressible element and an opposite end of said cable fastened to said pulley so that said cable can wrap around at least a portion of said outer curved surface of said pulley as said housing pivots relative to said pulley, to thereby compress said compressible element between said one end of said cable and said spring base,
wherein said spring base is movable relative to said mounting hub toward or away from said one end of said cable engaged to said outboard end of said compressible element, to thereby adjust the compression of the compressible element between said one end of said cable and said head of said spring base, and
wherein said spring base includes a hollow piston slidably mounted within said hollow stem, said piston including said head disposed outside said hollow stem within said hollow tubular portion of said housing.

22. The arm assembly of claim 21, wherein:
said housing includes a hollow tubular portion adjacent said mounting hub; and
said mounting hub includes;
a hollow stem sized and configured for a tight fit within said hollow tubular portion; and
fasteners for fastening said mounting hub to said housing with said stem disposed within said hollow tubular portion.

23. The arm assembly of claim 21, further comprising an adjustment screw mounted for rotation relative to said hollow stem and threadedly engaged to said piston of said spring base, whereby rotation of said adjustment screw cause movement of said piston relative to said hollow stem.

24. The arm assembly of claim 21, wherein said resiliently compressible element includes one or more compression springs.

25. The arm assembly of claim 24, wherein the resiliently compressible element includes two or more compression springs in stacked relation with said cable extending through each of said two or more springs.

26. The arm assembly of claim 21, wherein said cable includes an end cap affixed to said one end of said cable, said end cap configured to engage said outboard end of said compressible element.

* * * * *